US012462754B2

(12) United States Patent
Hwang et al.

(10) Patent No.: US 12,462,754 B2
(45) Date of Patent: Nov. 4, 2025

(54) SUB-PIXEL, DISPLAY DEVICE INCLUDING THE SAME, AND DRIVING METHOD THEREOF

(71) Applicant: Samsung Display Co., LTD., Yongin-si (KR)

(72) Inventors: Sung Yoon Hwang, Yongin-si (KR); Gi Chang Lee, Yongin-si (KR); Sang Yong No, Yongin-si (KR); Kyung Ho Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/759,934

(22) Filed: Jun. 30, 2024

(65) Prior Publication Data

US 2025/0124866 A1 Apr. 17, 2025

(30) Foreign Application Priority Data

Oct. 12, 2023 (KR) ........................ 10-2023-0136078

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0852* (2013.01); *G09G 2300/0861* (2013.01); *G09G 2310/08* (2013.01); *G09G 2320/02* (2013.01); *G09G 2320/041* (2013.01)

(58) Field of Classification Search
None
See application file for complete search history.

(56) References Cited

U.S. PATENT DOCUMENTS

| | | | | |
|---|---|---|---|---|
| 2023/0069681 | A1 | 3/2023 | Jo et al. | |
| 2023/0070610 | A1 | 3/2023 | Zhang et al. | |
| 2023/0097941 | A1 * | 3/2023 | Sang | G09G 3/3233 345/204 |
| 2024/0161684 | A1 | 5/2024 | Lee et al. | |

FOREIGN PATENT DOCUMENTS

| | | | |
|---|---|---|---|
| JP | 2010217661 | A | 9/2010 |
| JP | 2023039901 | A | 3/2023 |
| KR | 1020230033240 | A | 3/2023 |
| KR | 1020230046700 | A | 4/2023 |
| KR | 1020240069906 | A | 5/2024 |

* cited by examiner

*Primary Examiner* — Christopher J Kohlman
(74) *Attorney, Agent, or Firm* — CANTOR COLBURN LLP

(57) ABSTRACT

A sub-pixel includes a fourth transistor including a first electrode connected to the third node, a second electrode connected to a second power line, to which a reference voltage is applied, and a gate electrode connected to a first emission control line; a fifth transistor including a first electrode connected to the first node, a second electrode connected to a fourth node, and a gate electrode connected to a second emission control line; a capacitor including a first electrode connected to the second node and a second electrode connected to the third node; and a light emitting element including a first electrode connected to the fourth node and a second electrode connected to a fourth power line, to which a second driving voltage is applied.

19 Claims, 28 Drawing Sheets

<PR5>

SUB-PIXEL, DISPLAY DEVICE INCLUDING THE SAME, AND DRIVING METHOD THEREOF

This application claims priority to Korean Patent Application No. 10-2023-0136078, filed on Oct. 12, 2023, and all the benefits accruing therefrom under 35 U.S.C. § 119, the content of which in its entirety is herein incorporated by reference.

BACKGROUND

1. Field

Embodiments of the invention relate to a sub-pixel, a display device including the sub-pixel, and a driving method thereof.

2. Description of the Related Art

As an information technology is developed, an importance of a display device, which is a connection medium between users and information, has been highlighted. Therefore, various types of display device such as a liquid crystal display device, an organic light emitting diode display device, and the like are widely used in various fields.

Recently, a head-mounted display device (HMD) has been developed. The head-mounted display device is a display device that the user wears in the form of glasses or a helmet to implement virtual reality (VR) or augmented reality (AR) that focuses on a distance close to the eyes. High-resolution panels may be used in the head-mounted display device, and thus pixels that can be applied to high-resolution panels are desired.

SUMMARY

Embodiments of the invention provide a sub-pixel applicable to a high-resolution panel, a display device including the sub-pixel, and a driving method thereof.

A sub-pixel according to an embodiment of the invention includes a first transistor including a first electrode connected to a first node, a second electrode connected to a first power line to which a first driving voltage is applied, and a gate electrode connected to a second node; a second transistor including a first electrode connected to the first node, a second electrode connected to the second node, and a gate electrode connected to a first sub-gate line; a third transistor including a first electrode connected to one of a plurality of data lines, a second electrode connected to a third node, and a gate electrode connected to a second sub-gate line; a fourth transistor including a first electrode connected to the third node, a second electrode connected to a second power line to which a reference voltage is applied, and a gate electrode connected to a first emission control line; a fifth transistor including a first electrode connected to the first node, a second electrode connected to a fourth node, and a gate electrode connected to a second emission control line; a sixth transistor including a first electrode connected to the fourth node, a second electrode connected to a third power line to which an initialization voltage is applied, and a gate electrode connected to a third sub-gate line; a capacitor including a first electrode connected to the second node and a second electrode connected to the third node; and a light emitting element including a first electrode connected to the fourth node and a second electrode connected to a fourth power line to which a second driving voltage is applied.

In an embodiment, an emission control signal input to the second emission control line may be a phase-delayed signal by one horizontal period from an emission control signal input to the first emission control line.

In an embodiment, the capacitor may be a first capacitor, and the sub-pixel may further include a second capacitor including a first electrode connected to the second node and a second electrode connected to the first power line.

In an embodiment, each of the first to sixth transistors may be a P-type transistor.

In an embodiment, a voltage level of the first driving voltage may be higher than a voltage level of the second driving voltage.

In an embodiment, each of the second transistor, the fourth transistor, the fifth transistor, and the sixth transistor may be turned on during a first period, and the third transistor may be turned off during the first period.

In an embodiment, during the first period, the initialization voltage may be applied to the second node, and the reference voltage may be applied to the third node.

In an embodiment, each of the first transistor, the second transistor, and the third transistor may be turned on during a second period after the first period, and each of the fourth transistor and the fifth transistor may be turned off during the second period.

In an embodiment, the first driving voltage may be applied to the second node during the second period, and a voltage of a data signal may be applied to the third node during the second period.

In an embodiment, each of the first transistor, the fourth transistor, and the fifth transistor may be turned on during a third period after the second period, and each of the third transistor and the sixth transistor may be turned off during the third period.

In an embodiment, a current may flow through the first transistor and the fifth transistor during the third period, and the reference voltage may be applied to the third node during the third period.

A display device according to an embodiment of the invention includes a display panel including a plurality of sub-pixels, a plurality of data lines, a plurality of sub-gate lines, and a plurality of emission control lines connected to the plurality of sub-pixels; a data driver which provides data signals to the plurality of data lines; a gate driver which provides gate signals to the plurality of sub-gate lines and emission control signals to the plurality of emission control lines; and a voltage generator which applies an initialization voltage, a reference voltage, a first driving voltage, and a second driving voltage to the plurality of sub-pixels, where the plurality of sub-gate lines include first to third sub-gate lines, the plurality of emission control lines include first and second emission control lines, and a sub-pixel of the plurality of sub-pixels includes a first transistor including a first electrode connected to a first node, a second electrode connected to a first power line to which the first driving voltage is applied, and a gate electrode connected to a second node, a second transistor including a first electrode connected to the first node, a second electrode connected to the second node, and a gate electrode connected to the first sub-gate line, a third transistor including a first electrode connected to one of the plurality of data lines, a second electrode connected to a third node, and a gate electrode connected to the second sub-gate line, a fourth transistor including a first electrode connected to the third node, a second electrode connected to a second power line to which the reference voltage is applied, and a gate electrode connected to the first emission control line, a fifth transistor including a first electrode connected to the first node, a second electrode connected to a fourth node, and a gate electrode connected to the second emission control line, a sixth transistor including a first electrode connected to the fourth node, a second electrode connected to a third power line to which the initialization voltage is applied, and a gate electrode connected to the third sub-gate line, a capacitor including a first electrode connected to the second node and a second electrode connected to the third node, and a light emitting element including a first electrode connected to the fourth node and a second electrode connected to a fourth power line to which the second driving voltage is applied.

In an embodiment, an emission control signal input to the second emission control line may be a phase-delayed signal by one horizontal period from an emission control signal input to the first emission control line.

In an embodiment, the capacitor may be a first capacitor, and the sub-pixel may further include a second capacitor including a first electrode connected to the second node and a second electrode connected to the first power line.

In an embodiment, the gate driver may provide a gate signal at a turn-on level to each of the second transistor, the fourth transistor, the fifth transistor, and the sixth transistor during a first period, and provides a gate signal of at a turn-off level to the third transistor during the first period.

In an embodiment, the gate driver may provide a gate signal at a turn-on level to each of the first transistor, the second transistor, and the third transistor during a second period after the first period and may provide a gate signal at a turn-off level to each of the fourth transistor and the fifth transistor during the second period.

In an embodiment, the gate driver may provide a gate signal at a turn-on level to each of the first transistor, the fourth transistor, and the fifth transistor during a third period after the second period and may provide a gate signal at a turn-off level to each of the third transistor and the sixth transistor during the third period.

A driving method of a sub-pixel including a first transistor and a capacitor, includes during a first period, supplying an initialization voltage to a second node connected to a first electrode of the capacitor and a gate electrode of the first transistor, and supplying a reference voltage to a third node connected to a second electrode of the capacitor; during a second period, floating the third node; during a third period, supplying a first driving voltage to the second node and supplying a data signal to the third node; during a fourth and fifth period, floating the second node and the third node; during a sixth period, floating the second node and supplying the reference voltage to the third node; and during a seventh period, allowing a current to flow in the first transistor based on a voltage applied to the second node.

In an embodiment, the sub-pixel further includes a light emitting element, and the initialization voltage may be supplied to the light emitting element during the first period.

In an embodiment, during the first period, a first gate signal at a turn-on level may be supplied to a second transistor of the sub-pixel, which connects the first node connected to a first electrode of the first transistor and the second node.

According to embodiments of the invention, a sub-pixel applicable to a high-resolution panel, a display device including the sub-pixel, and a driving method thereof can be provided.

DETAILED DESCRIPTION

Figure 1:
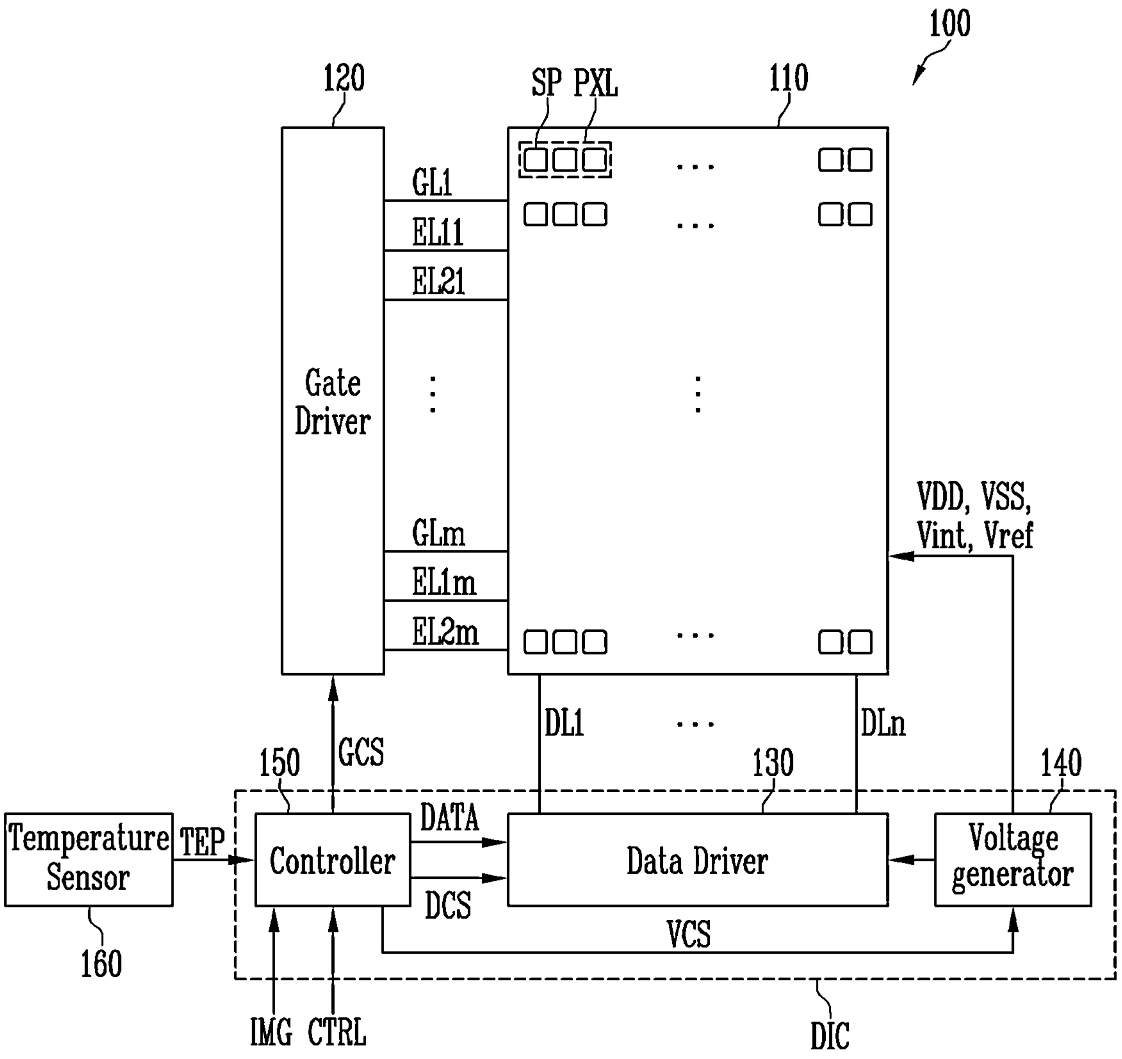
FIG. 1 is a block diagram showing an embodiment of a display device.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Throughout the specification, when a part is said to be "connected" to another part, this includes not only the case where it is "directly connected" but also the case where it is "indirectly connected" with another element therebetween. The term used in this specification is for the purpose of describing the embodiments and is not intended to limit the invention.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. "at least one of X, Y, and Z", and "at least one selected from X, Y, and Z" may be interpreted as an X, a Y, a Z, or any combination (e.g., XYZ, XYY, YZ, and ZZ) of two or more among X, Y, and Z. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Here, terms such as first, second, etc. may be used to describe various components, but these components are not limited to these terms. These terms are used only to distinguish one constituent element from another constituent element. Accordingly, the first component may be referred to as the second component within the scope of what is disclosed herein.

Spatially relative terms such as "below," "above," etc. may be used for descriptive purposes, thereby describing the relationship of one element or feature to another element(s) or feature(s) as shown in the drawings. Spatially relative terms are intended to include different directions in use, operation, and/or manufacture in addition to the directions depicted in the drawings. For example, if the device shown in the drawings is turned over, elements depicted as being disposed "below" other elements or features may be disposed "above" the other elements or features. Accordingly, in one embodiment, the term "below" may include both above and below directions. Additionally, the device may be oriented in other directions (e.g., rotated by 90 degrees or in other orientations), and thus the spatially relative terms used herein should be interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Various embodiments are described with reference to drawings that schematize ideal embodiments. Accordingly, it will be expected that the shapes may vary depending, for example, on tolerances and/or manufacturing techniques. Accordingly, embodiments disclosed herein should not be construed as being limited to the specific shapes shown and should be construed to include changes in shapes that occur, for example, as a result of manufacturing. As such, the shapes shown in the drawings may not depict the actual shapes of areas of the device, and the embodiments are not limited thereto.

FIG. 1 is a block diagram showing an embodiment of a display device.

Referring to FIG. 1, an embodiment of the display device 100 may include a display panel 110, a gate driver 120, a data driver 130, a voltage generator 140, and a controller 150.

The display panel 110 may include sub-pixels SP. The sub-pixels SP may be connected to the gate driver 120 through first to m-th gate lines GL1 to GLm. The sub-pixels SP may be connected to the data driver 130 through first to n-th data lines DL1 to DLn. The first to m-th gate lines GL1 to GLm may extend in the first direction DR1 and be sequentially arranged in the second direction DR2 that intersects the first direction DR1. The first to n-th data lines DL1 to DLn may extend in the second direction DR2 and be sequentially arranged in the first direction DR1.

Each of the sub-pixels SP may include at least one light emitting element configured to generate light. Accordingly, each of the sub-pixels SP can generate light of a specific color, such as red, green, blue, cyan, magenta, yellow, etc. Two or more sub-pixels among the sub-pixels SP may constitute or collectively define one pixel (or unit pixel) PXL. In an embodiment, for example, as shown in FIG. 1, three sub-pixels may constitute one pixel PXL.

The gate driver 120 may be connected to the sub-pixels SP arranged in the row direction through the first to m-th gate lines GL1 to GLm. The gate driver 120 may output gate signals to the first to m-th gate lines GL1 to GLm in response to gate control signal GCS. In embodiments, the gate control signal GCS may include a start signal indicating the start of each frame, a horizontal synchronization signal for outputting gate signals in synchronization with the timing at which data signals are applied, etc.

In embodiments, first emission control lines EL11 to EL1*m* and second emission control lines EL21 to EL2*m* connected to the sub-pixels SP in the row direction may be further provided. The first emission control lines EL11 to EL1*m* and the second emission control lines EL21 to EL2*m* may extend in the first direction DR1 and be sequentially arranged in the second direction DR2. In an embodiment, the gate driver 120 may include an emission control driver configured to control the first emission control lines EL11 to EL1*m* and the second emission control lines EL21 to EL2*m*, and the emission control driver may operate under the control of the controller 150.

In an embodiment, the gate driver 120 may be disposed on one side of the display panel 110. However, embodiments are not limited thereto. In another embodiment, for example, the gate driver 120 may be divided into two or more physically and/or logically separated drivers, and such drivers may be disposed on one side of the display panel 110 and another side of the display panel 110 opposite the one side. In embodiments, the gate driver 120 may be disposed around the display panel 110 in various forms according to embodiments.

The data driver 130 may be connected to the sub-pixels SP arranged in the column direction through the first to n-th data lines DL1 to DLn. The data driver 130 may receive image data DATA and data control signal DCS from the controller 150. The data driver 130 may operate in response to the data control signal DCS. In embodiments, the data control signal DCS may include a source start pulse, a source shift clock, a source output enable signal, etc.

The data driver 130 may apply data signals having grayscale voltages corresponding to the image data DATA to the first to n-th data lines DL1 to DLn using the voltages from the voltage generator 140. When a gate signal is applied to each of the first to m-th gate lines GL1 to GLm, data signals corresponding to the image data DATA may be applied to the data lines DL1 to DLm. Accordingly, the corresponding sub-pixels SP can generate light corresponding to data signals. Accordingly, an image may be displayed on the display panel 110.

In embodiments, the gate driver 120 and data driver 130 may include complementary metal-oxide semiconductor (CMOS) circuit elements.

The voltage generator 140 may operate in response to a voltage control signal (VCS) from the controller 150. The voltage generator 140 may be configured to generate a plurality of voltages and provide the generated voltages to components of the display device 100. In an embodiment, for example, the voltage generator 140 may be configured to generate a plurality of voltages by receiving an input voltage from outside the display device 100, adjusting the received voltage, and regulating the adjusted voltage.

The voltage generator 140 may generate a first driving voltage (VDD) and a second driving voltage VSS, and the generated first and second driving voltages VDD and VSS may be provided to the sub-pixels SP. The first driving voltage (VDD) may have a relatively high voltage level, and the second driving voltage VSS may have a lower voltage level than the first driving voltage (VDD). In other embodiments, the first driving voltage VDD or the second driving voltage VSS may be provided by an external device of the display device 100.

In an embodiment, the voltage generator 140 can generate various voltages. In an embodiment, for example, the voltage generator 140 may generate an initialization voltage Vint applied to the sub-pixels SP. In an embodiment, for example, the voltage generator 140 may generate a reference voltage Vref applied to the sub-pixels SP.

The controller 150 may control various operations of the display device 100. The controller 150 may receive input image data IMG from the outside and a control signal CTRL for controlling a display of an image corresponding to the input image data. The controller 150 may provide a gate control signal GCS, a data control signal DCS, and a voltage control signal VCS based on the control signal CTRL.

The controller 150 may convert the input image data IMG to suit the display device 100 or display panel 110 and output image data DATA. In embodiments, the controller 150 may output image data DATA by aligning the input image data IMG to suit the sub-pixels SP in units of row.

Two or more components of the data driver 130, voltage generator 140, and controller 150 may be mounted on one integrated circuit. In an embodiment, as shown in FIG. 1, the data driver 130, voltage generator 140, and controller 150 may be included in a driver integrated circuit DIC. In such an embodiment, the data driver 130, voltage generator 140, and controller 150 may be functionally separate components within one driver integrated circuit DIC. In other embodiments, at least one selected from the data driver 130, the voltage generator 140, and the controller 150 may be provided as a separate component from the driver integrated circuit DIC.

In an embodiment, the display device 100 may further include a temperature sensor 160. The temperature sensor 160 may be configured to sense the temperature of surroundings thereof and generate temperature data TEP representing the sensed temperature. In embodiments, the temperature sensor 160 may be disposed adjacent to the display panel 110 and/or the driver integrated circuit DIC.

The controller 150 may control various operations of the display device 100 in response to temperature data TEP. In embodiments, the controller 150 may adjust luminance of an image output from the display panel 110 in response to temperature data TEP. In an embodiment, for example, the controller 150 may adjust data signals and the first and second driving voltages VDD and VSS by controlling components such as the data driver 130 and/or the voltage generator 140.

Figure 2:
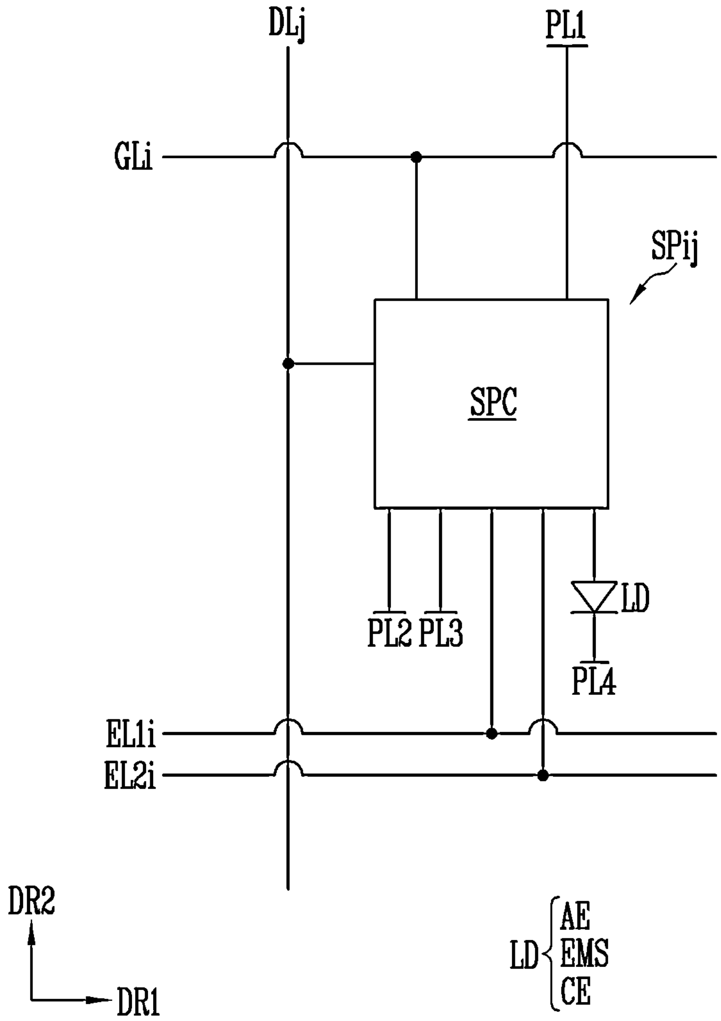
FIG. 2 is a block diagram showing an embodiment of one of the sub-pixels of FIG. 1.

FIG. 2 is a block diagram showing an embodiment of one of the sub-pixels of FIG. 1. In FIG. 2, a sub-pixel SPij arranged in an i-th row (i is an integer greater than or equal to 1 and less than or equal to m) and a j-th column (j is an integer greater than or equal to 1 and less than or equal to n) among the sub-pixels SP of FIG. 1, is shown as an example.

Referring to FIG. 2, an embodiment of the sub-pixel SPij may include a sub-pixel circuit SPC and a light emitting element LD.

In an embodiment, the sub-pixel SPij may be connected to first to fourth power lines PL1 to PL4. In such an embodiment, the first power line PL1 may be a power line that transmits the first driving voltage VDD of FIG. 1 to the sub-pixel SPij, the second power line PL2 may be a power line that transmits the reference voltage Vref of FIG. 1 to the sub-pixel SPij, the third power line PL3 may be a power line that transmits the initialization voltage Vint of FIG. 1 to the sub-pixel SPij, and the fourth power line PL4 may be a power line that transmits the second driving voltage VSS of FIG. 1 to the sub-pixel SPij.

The light emitting element LD may be connected between the first power line PL1 and the fourth power line PL4. The anode electrode AE of the light emitting element LD may be connected to the first power line PL1 through the sub-pixel circuit SPC, and the cathode electrode CE of the light emitting element LD may be connected to the fourth power line PL4. In an embodiment, for example, the anode electrode AE of the light emitting element LD may be connected to the first power line PL1 through one or more transistors included in the sub-pixel circuit SPC.

The sub-pixel circuit SPC may be connected to the i-th gate line GLi among the first to m-th gate lines GL1 to GLm of FIG. 1, an i-th first emission control line EL1(*i*) among first to m-th first emission control lines EL11 to EL1*m* and an i-th second emission control line EL2(*i*) among first to m-th second emission control lines EL21 to EL2*m* of FIG. 1, and the j-th data line DLj among the first to n-th data lines DL1 to DLn of FIG. 1. The sub-pixel circuit SPC may be configured to control the light emitting element LD depending on signals received through these signal lines.

The sub-pixel circuit SPC may operate in response to a gate signal received through the i-th gate line GLi. The i-th gate line GLi may include one or more sub-gate lines. In an embodiment where the i-th gate line GLi includes two or more sub-gate lines, the sub-pixel circuit SPC may operate in response to gate signals received through the corresponding sub-gate lines.

The sub-pixel circuit SPC may operate in response to emission control signals received through the first and second emission control lines EL1*i* and EL2*i*.

The sub-pixel circuit SPC may receive a data signal through the j-th data line DLj. The sub-pixel circuit SPC may store a voltage corresponding to a data signal in response to at least one selected from the gate signals received through the sub-gate lines of the i-th gate line GLi. The sub-pixel circuit SPC may respond to the emission control signal received through the i-th first and second emission control lines EL1*i* and EL2*i* to adjust the current flowing from the first power line PL1 through the light emitting element LD to the fourth power line PL4 depending on the stored voltage. Accordingly, the light emitting element LD may generate light with luminance corresponding to the data signal.

Figure 3:
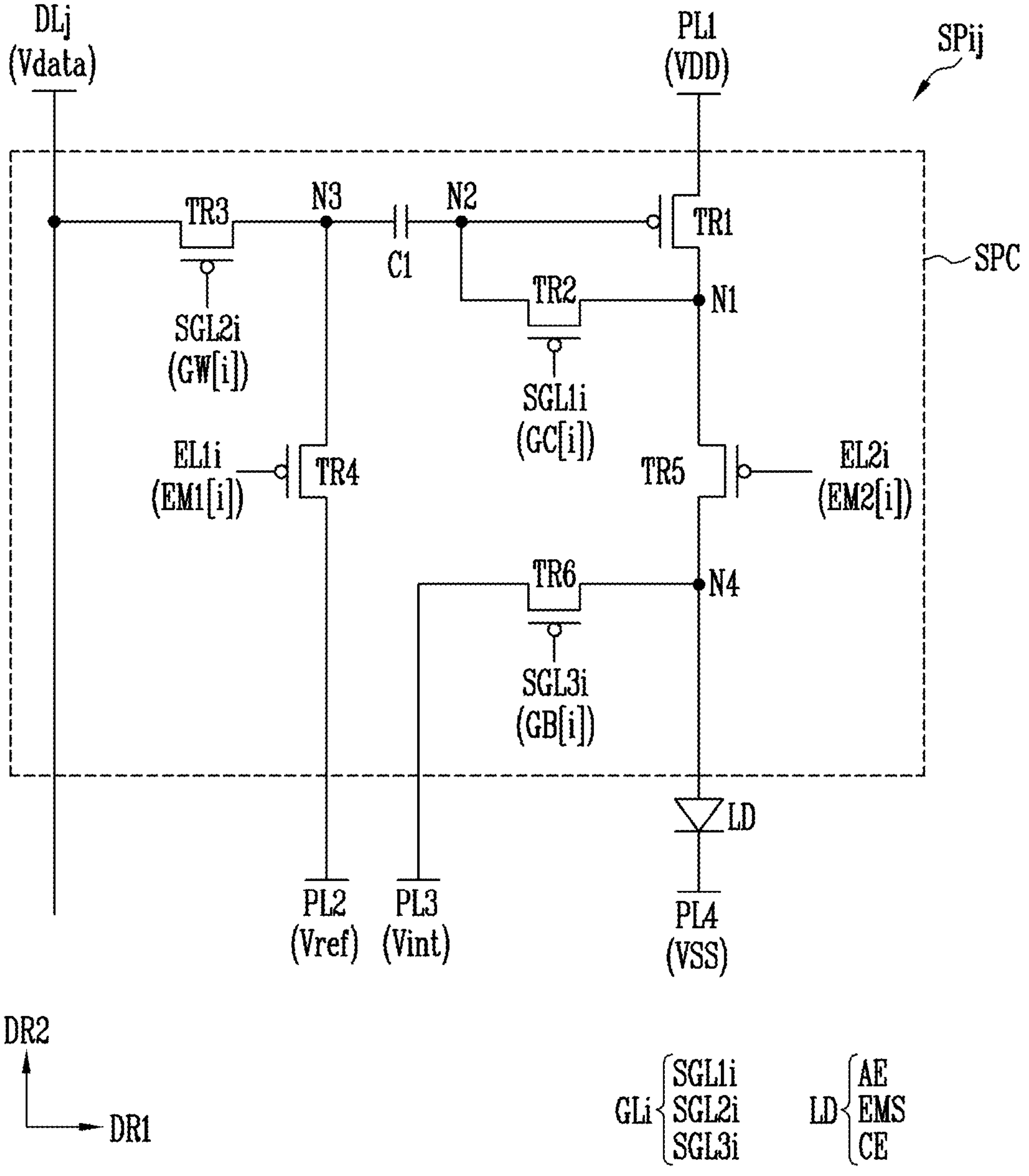
FIG. 3 is a circuit diagram showing an embodiment of the sub-pixel shown in FIG. 2.

FIG. 3 is a circuit diagram showing an embodiment of the sub-pixel shown in FIG. 2. In FIG. 3, a sub-pixel SPij arranged in the i-th row (i is an integer greater than or equal to 1 and less than or equal to m) and the j-th column (j is an integer greater than or equal to 1 and less than or equal to n) among the sub-pixels SP of FIG. 1, is shown as an example.

Referring to FIGS. 2 and 3, the sub-pixel SPij may include a sub-pixel circuit SPC and a light emitting element LD. The sub-pixel circuit SPC may control the amount of current supplied to the light emitting element LD.

The sub-pixel circuit SPC may include one or more transistors and one or more capacitors.

Referring to FIG. 3, the sub-pixel circuit SPC according to embodiments of the invention may include a first transistor TR1, a second transistor TR2, a third transistor TR3, a fourth transistor TR4, a fifth transistor TR5, a sixth transistor TR6, and a first capacitor C1. In an embodiment, each of the first to sixth transistors TR1 to TR6 may be a P-type metal oxide semiconductor field effect transistor (MOSFET).

A first electrode of the first transistor TR1 may be connected (e.g., electrically connected) to a first node N1, a second electrode thereof may be connected to the first power line PL1 to which the first driving voltage VDD is applied, and a gate electrode thereof may be connected (e.g., electrically connected) to a second node N2.

A first electrode of the second transistor TR2 may be connected (e.g., electrically connected) to the first node N1, a second electrode thereof may be connected (e.g., electrically connected) to the second node N2, and a gate electrode thereof may be electrically connected to a first sub-gate line SGL1*i*. The second transistor TR2 may be turned on in response to a first gate signal GC[i] at the turn-on level supplied to the first sub-gate line SGL1*i*.

A first electrode of the third transistor TR3 may be electrically connected to the j-th data line DLj, a second electrode thereof may be connected (e.g., electrically connected) to the third node, and a gate electrode thereof may be electrically connected to the second sub gate line SGL2*i*. The third transistor TR3 may be turned on in response to a second gate signal GW[i] at a turn-on level supplied to a second sub-gate line SGL2*i*. The data signal Vdata may be supplied through the j-th data line DLj.

A first electrode of the fourth transistor TR4 may be connected (e.g., electrically connected) to a third node N3, a second electrode thereof may be connected (e.g., electrically connected) to the second power line PL2 to which the reference voltage Vref is applied, and a gate electrode thereof may be electrically connected to a first emission control line EL1*i*. The fourth transistor TR4 may be turned on in response to a first emission control signal EM1[*i*] at a turn-on level supplied to the first emission control line EL1*i*.

A first electrode of the fifth transistor TR5 may be connected (e.g., electrically connected) to the first node N1, a second electrode thereof may be connected (e.g., electrically connected) to a fourth node N4, and a gate electrode thereof may be electrically connected to a second emission control line EL2*i*. The fifth transistor TR5 may be turned on in response to a second emission control signal EM2[*i*] at a turn-on level supplied to the second emission control line EL2*i*.

A first electrode of the sixth transistor TR6 may be connected (e.g., electrically connected) to the fourth node N4, a second electrode thereof may be connected (e.g., electrically connected) to the third power line PL3 to which the initialization voltage Vint is applied, and a gate electrode thereof may be electrically connected to a third sub-gate line SGL3*i*. The sixth transistor TR6 may be turned on in response to a third gate signal GB[i] at a turn-on level supplied to the third sub-gate line SGL3*i*.

A first electrode of the first capacitor C1 may be connected (e.g., electrically connected) to the second node N2, and a second electrode thereof may be connected (e.g., electrically connected) to the third node N3.

A first electrode of the light emitting element LD may be connected (e.g., electrically connected) to the fourth node N4, a second electrode thereof may be connected (e.g., electrically connected) to the fourth power line PL4 to which the second driving voltage VSS is applied.

The light emitting element LD may generate light (e.g., light of a certain luminance) in response to the amount of current (e.g., size of the driving current) supplied from the first power line PL1 to the fourth power line PL4 via the sub-pixel circuit SPC.

In an embodiment, the light emitting element LD may include an organic light emitting diode. In an embodiment, the light emitting element LD may include an inorganic light emitting diode, such as a micro LED (light emitting diode) or a quantum dot light emitting diode. In an embodiment, the light emitting element LD may be an element composed of a composite of organic and inorganic materials. In FIG. 3, an embodiment of the sub-pixel PXij including a single light emitting element LD is shown, but in another embodiment, the sub-pixel PXij may include a plurality of light emitting elements LD and the plurality of light emitting elements LD may be connected to each other in series, parallel, or series-parallel.

Figure 4:
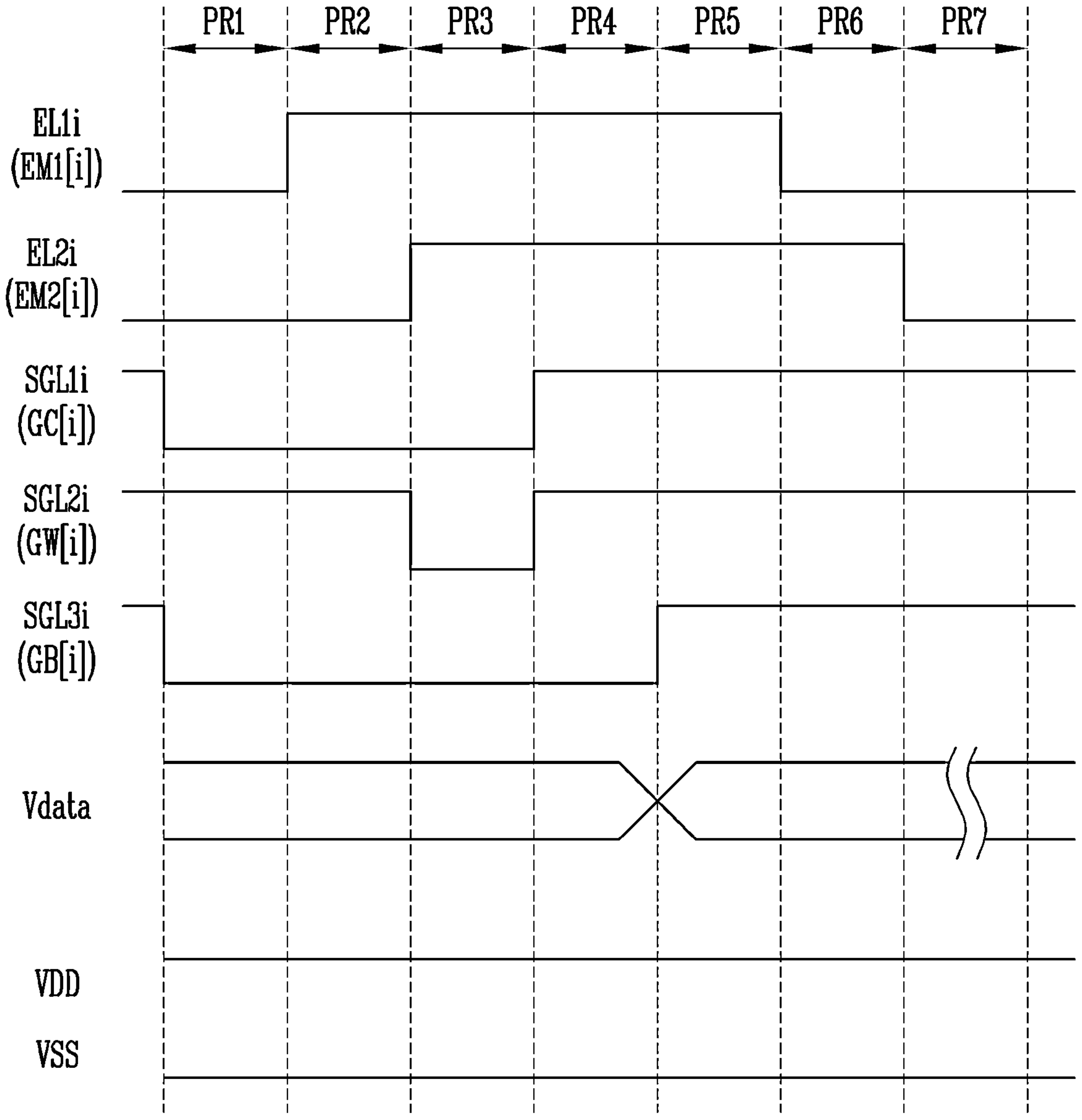
FIG. 4 is a signal timing diagram showing an embodiment of a driving method of the sub-pixel shown in FIG. 3.

FIG. 4 is a signal timing diagram showing an embodiment of a driving method of the sub-pixel shown in FIG. 3. In FIG. 4, signals supplied to the sub-pixels SPij arranged in the i-th row (i is an integer greater than or equal to 1 and less than or equal to m) and the j-th column (j is an integer greater than or equal to 1 and less than or equal to n) among the sub-pixels SP of FIG. 1, is shown as an example.

Referring to FIGS. 1, 3, and 4, in an embodiment, the gate driver 120 may supply the first emission control signal EM1[*i*] at the turn-on level (e.g., low level) to the first emission control line EL1*i* during a first period PR1, a sixth period PR6, and a seventh period PR7.

The gate driver 120 may supply the second emission control signal EM2[*i*] at the turn-on level (e.g., low level) to the second emission control line EL2*i* during the first period PR1, the second period PR2, and the seventh period PR7. The second emission control signal EM2[*i*] may be a phase-delayed signal by one horizontal period (1H) from the first emission control signal EM1[*i*]. The one horizontal period (1H) may correspond to the length of the period during which a data signal is written to the sub-pixel.

The gate driver 120 may supply the first gate signal GC[i] at the turn-on level (e.g., low level) to the first sub-gate line SGL1*i* during the first to third periods PR1 to PR3.

The gate driver 120 may supply the second gate signal GW[i] at the turn-on level (e.g., low level) to the second sub-gate line SGL2*i* during the third period PR3.

The gate driver 120 may supply the third gate signal GB[i] at the turn-on level (e.g., low level) to the third sub-gate line SGL3*i* during the first to fourth periods PR1 to PR4.

The data driver 130 may supply the data signal Vdata to the j-th data line DLj during the first to seventh periods PR1 to PR7.

The first period PR1 may be a period in which the initialization voltage Vint is supplied to the second node N2 and the reference voltage Vref is supplied to the third node N3.

The second period PR2 may be a period in which the initialization voltage Vint is supplied to the second node N2 and the third node N3 may be floating (or constant voltage is not applied). The gate driver 120 may supply a second gate signal GW[i] at the turn-off level to the third transistor TR3 and a first emission control signal EM1[*i*] at the turn-off level to the fourth transistor TR4, thereby floating the third node N3.

The third period PR3 may be a period in which the first driving voltage VDD is supplied to the second node N2 and the data signal Vdata is supplied to the third node N3. The gate driver 120 may supply the second gate signal GW[i] at the turn-on level to the third transistor TR3, thereby supplying the data signal Vdata to the third node N3.

The fourth period PR4 and the fifth period PR5 may be periods in which the second node N2 and the third node N3 are floated. The gate driver 120 may supply a gate signal at the turn-off level to the second to fifth transistors TR2 to TR5, thereby floating the second node N2 and the third node N3.

The sixth period PR6 may be a period in which the second node N2 is floated and the reference voltage Vref is supplied to the third node N3. The gate driver 120 may supply a control signal at the turn-off level to the second transistor TR2, the fifth transistor TR5, and the sixth transistor TR6, thereby floating the second node N2.

The seventh period may be a period in which the reference voltage Vref is supplied to the third node N3 and the light emitting element LD emits light with luminance corresponding to the amount of current supplied from the first transistor TR1.

FIGS. 5 to 11 are circuit diagrams showing an operation process of the sub-pixel of FIG. 3 depending on signals of FIG. 4. In FIGS. 5 to 11, the operation process of the sub-pixels SPij arranged in the i-th row (i is an integer greater than or equal to 1 and less than or equal to m) and the j-th column (j is greater than or equal to 1 and less than or equal to n) among the sub-pixels SP of FIG. 1, is shown as an example.

Figure 5:
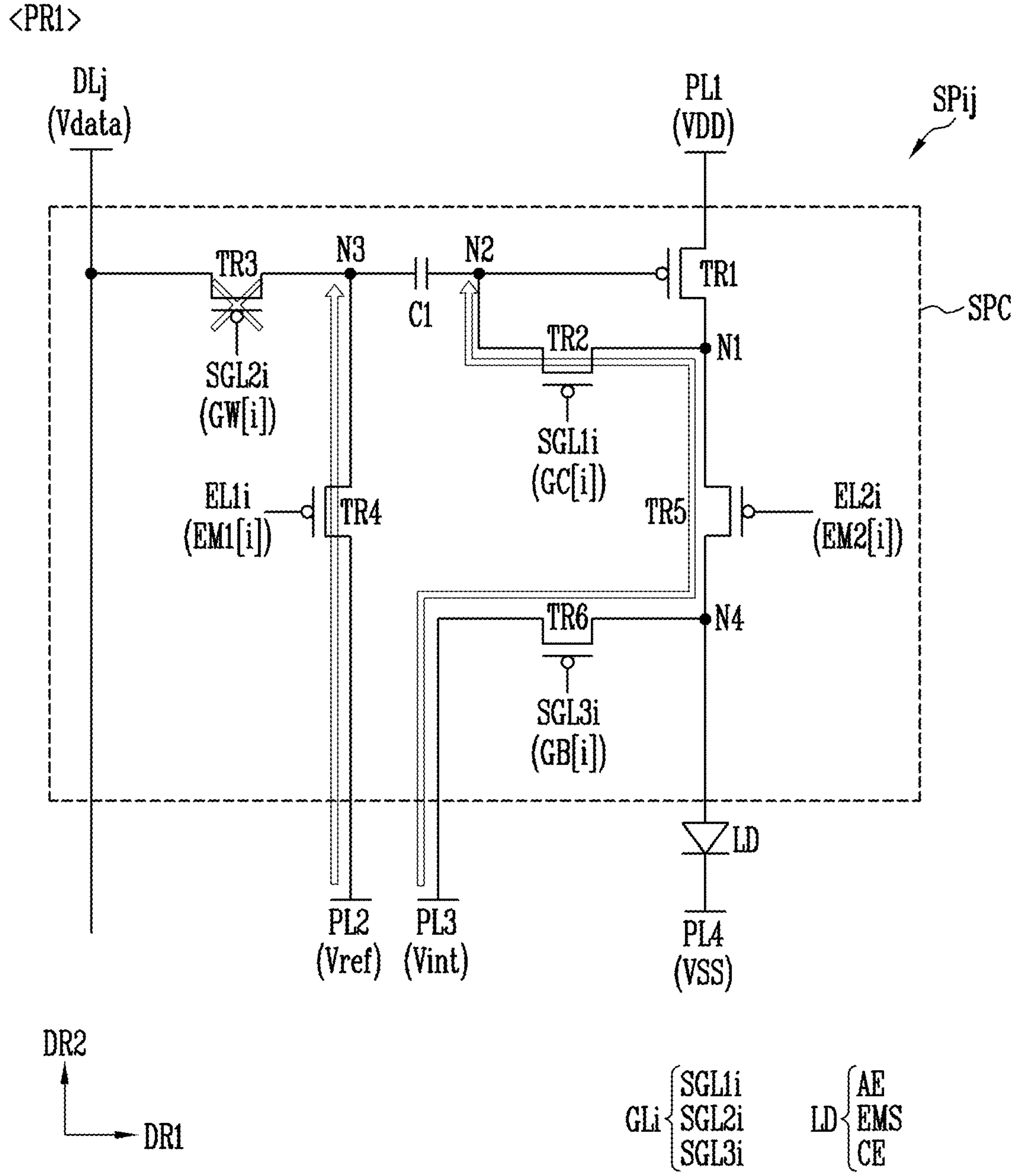
FIGS. 5 to 11 are circuit diagrams showing an operation process of the sub-pixel of FIG. 3 depending on signals of FIG. 4.

Referring to FIG. 5, the second transistor TR2 may be turned on by the first gate signal GC[i] at the turn-on level supplied to the first sub-gate line SGL1*i* during the first period PR1.

The third transistor TR3 may be turned off by the second gate signal GW[i] at the turn-off level (or high level) supplied to the second sub-gate line SGL2*i* during the first period PR1. When the third transistor TR3 is turned off, the electrical connection between the j-th data line DLj and the third node N3 may be blocked.

The fourth transistor TR4 may be turned on by the first emission control signal EM1[*i*] at the turn-on level supplied to the first emission control line EL1*i* during the first period PR1.

The fifth transistor TR5 may be turned on by the second emission control signal EM2[*i*] at the turn-on level supplied to the second emission control line EL2*i* during the first period PR1.

The sixth transistor TR6 may be turned on by the third gate signal GB[i] at the turn-on level supplied to the third sub-gate line SGL3*i* during the first period PR1.

Accordingly, the initialization voltage Vint may be applied to the second node N2 and the reference voltage Vref may be applied to the third node N3 during the first period PR1.

Figure 6:
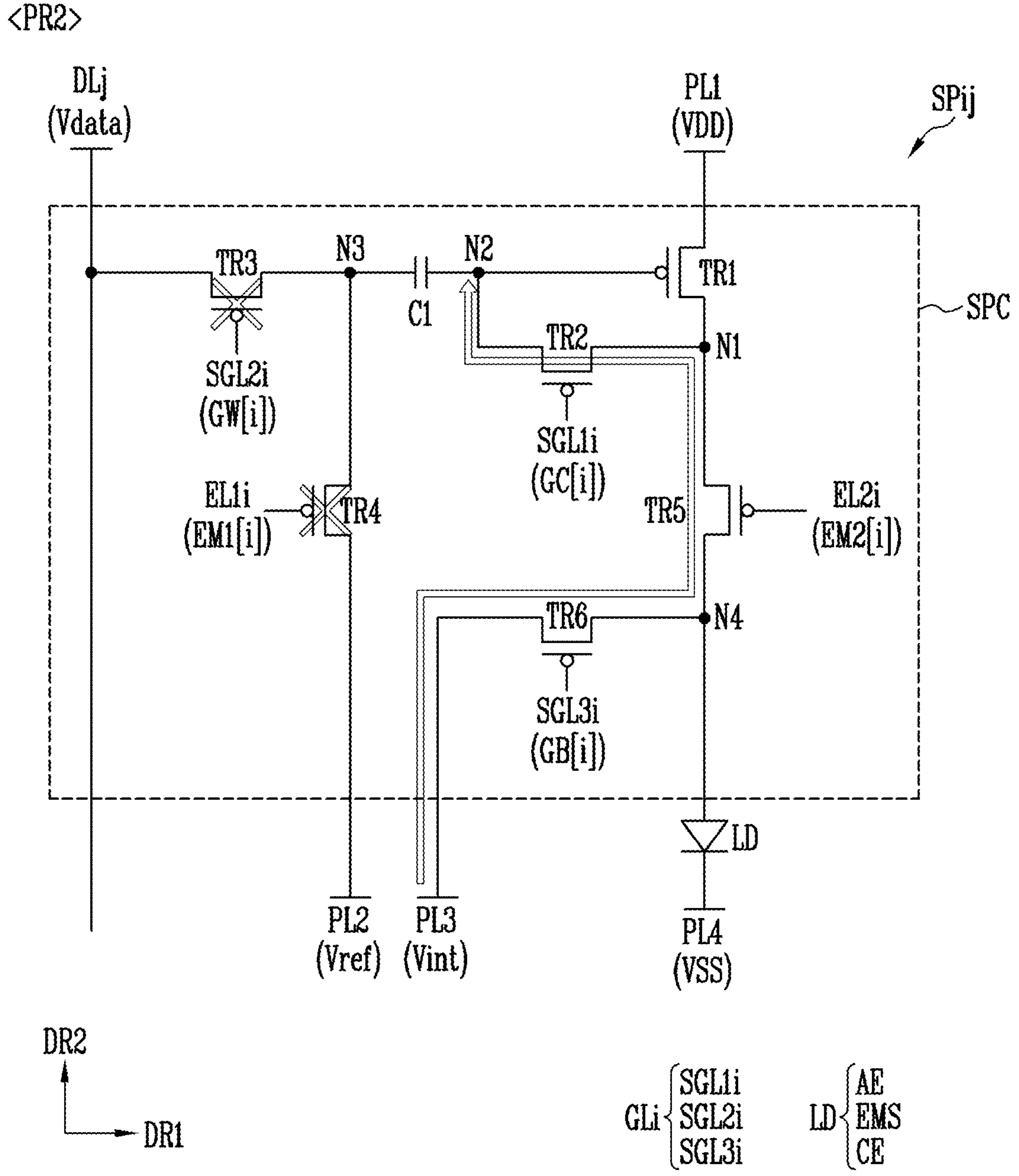

Referring to FIG. 6, the second transistor TR2 may maintain a turn-on state by the first gate signal GC[i] at the turn-on level supplied to the first sub-gate line SGL1*i* during the second period PR2.

The third transistor TR3 may maintain a turn-off state by the second gate signal GW[i] at the turn-off level supplied to the second sub-gate line SGL2*i* during the second period PR2.

The fourth transistor TR4 may be turned off by the first emission control signal EM1[*i*] at the turn-off level (or high level) supplied to the first emission control line EL1*i* during the second period PR2. When the fourth transistor TR4 is turned off, the electrical connection between the second power line PL2 and the third node N3 may be blocked.

The fifth transistor TR5 may maintain the turn-on state by the second emission control signal EM2[*i*] at the turn-on level supplied to the second emission control line EL2*i* during the second period PR2.

The sixth transistor TR6 may maintain the turn-on state by the third gate signal GB[i] at the turn-on level supplied to the third sub-gate line SGL3*i* during the second period PR2.

Accordingly, the voltage of the second node N2 during the second period PR2 may be the initialization voltage Vint, and the reference voltage Vref may be applied to the third node N3 during the second period PR2.

Figure 7:
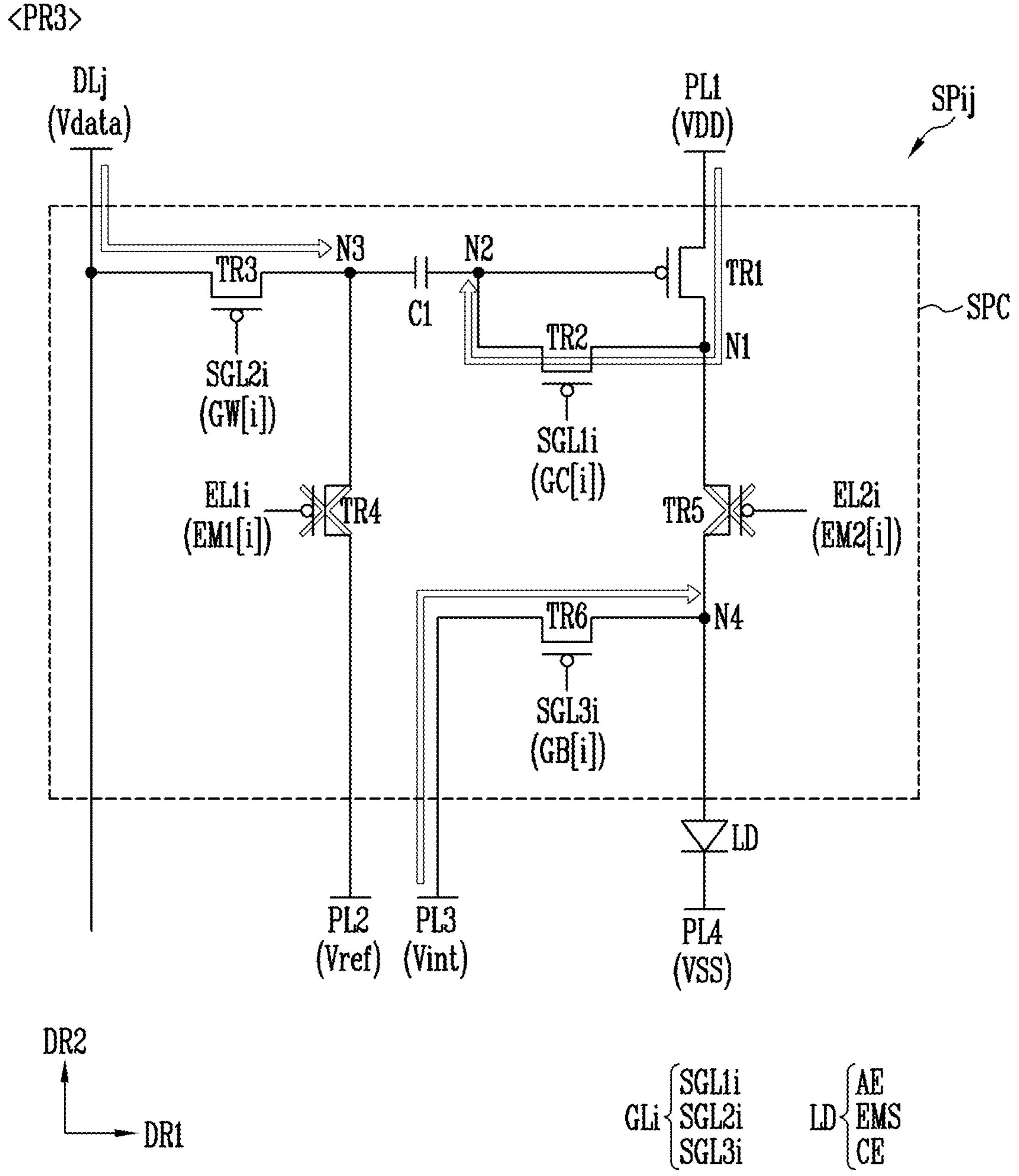

Referring to FIG. 7, the second transistor TR2 may maintain the turn-on state by the first gate signal GC[i] at the turn-on level supplied to the first sub-gate line SGL1*i* during the third period PR3.

The third transistor TR3 may be turned on by the second gate signal GW[i] at the turn-on level supplied to the second sub-gate line SGL2*i* during the third period PR3.

The fourth transistor TR4 may maintain the turn-off state by the first emission control signal EM1[*i*] at the turn-off level supplied to the i-th emission control line ELi during the third period PR3.

The fifth transistor TR5 may be turned off by the second emission control signal EM2[*i*] at the turn-off level (or high level) supplied to the second emission control line EL2*i* during the third period PR3. When the fifth transistor TR5 is turned off, the electrical connection between the first node N1 and the fourth node N4 may be blocked.

The sixth transistor TR6 may maintain the turn-on state by the third gate signal GB[i] at the turn-on level supplied to the third sub-gate line SGL3*i* during the third period PR3.

Accordingly, during the third period PR3, the voltage of the second node N2 may be (VDD−|Vth|_TR1), and the voltage of the third node N3 may be a voltage corresponding to the data signal Vdata.

Here, |Vth|_TR1 denotes the absolute value of the threshold voltage of the first transistor TR1.

Figure 8:
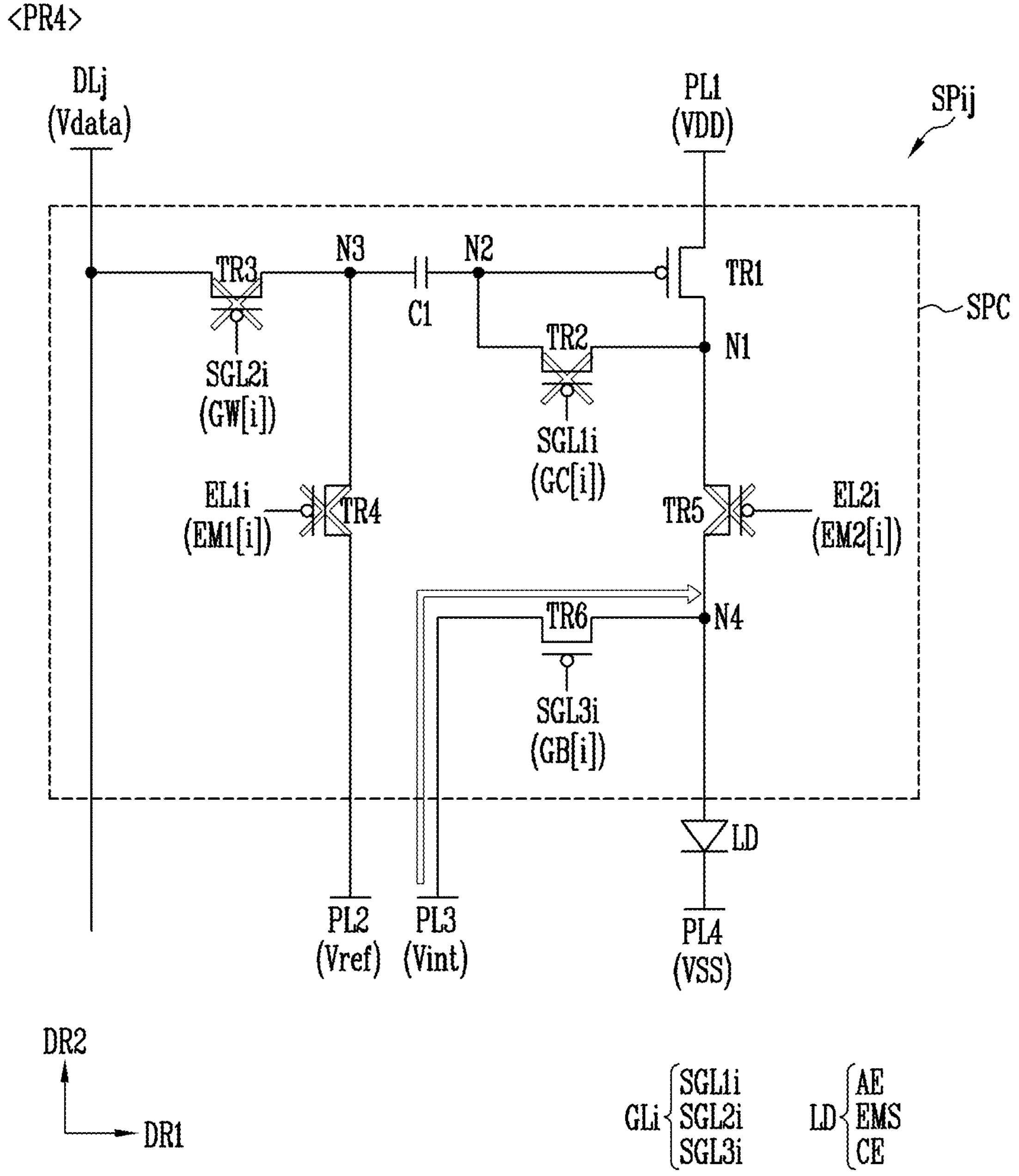

Referring to FIG. 8, the second transistor TR2 may be turned off by the first gate signal GC[i] at the turn-off level (or high level) supplied to the first sub-gate line SGL1*i* during the fourth period PR4. When the second transistor TR2 is turned off, the electrical connection between the first node N1 and the second node N2 may be blocked.

The third transistor TR3 may be turned off by the second gate signal GW[i] at the turn-off level supplied to the second sub-gate line SGL2*i* during the fourth period PR4. When the third transistor TR3 is turned off, the electrical connection between the j-th data line DLj and the third node N3 may be blocked.

The fourth transistor TR4 may maintain the turn-off state by the first emission control signal EM1[*i*] at the turn-off level supplied to the first emission control line EL1*i* during the fourth period PR4.

The fifth transistor TR5 may maintain the turn-off state by the second emission control signal EM2[*i*] at the turn-off level supplied to the second emission control line EL2*i* during the fourth period PR4.

The sixth transistor TR6 may maintain the turn-on state by the third gate signal GB[i] at the turn-on level supplied to the third sub-gate line SGL3*i* during the fourth period PR4.

Accordingly, during the fourth period PR4, the voltage of the second node N2 may be (VDD−|Vth|_TR1), and the voltage of the third node N3 may be a voltage corresponding to the data signal Vdata.

During the fourth period PR4, the initialization voltage Vint may be supplied to the fourth node N4. The voltage difference between the initialization voltage Vint and the second driving voltage VSS may be less than the threshold voltage of the light emitting element LD.

Figure 9:
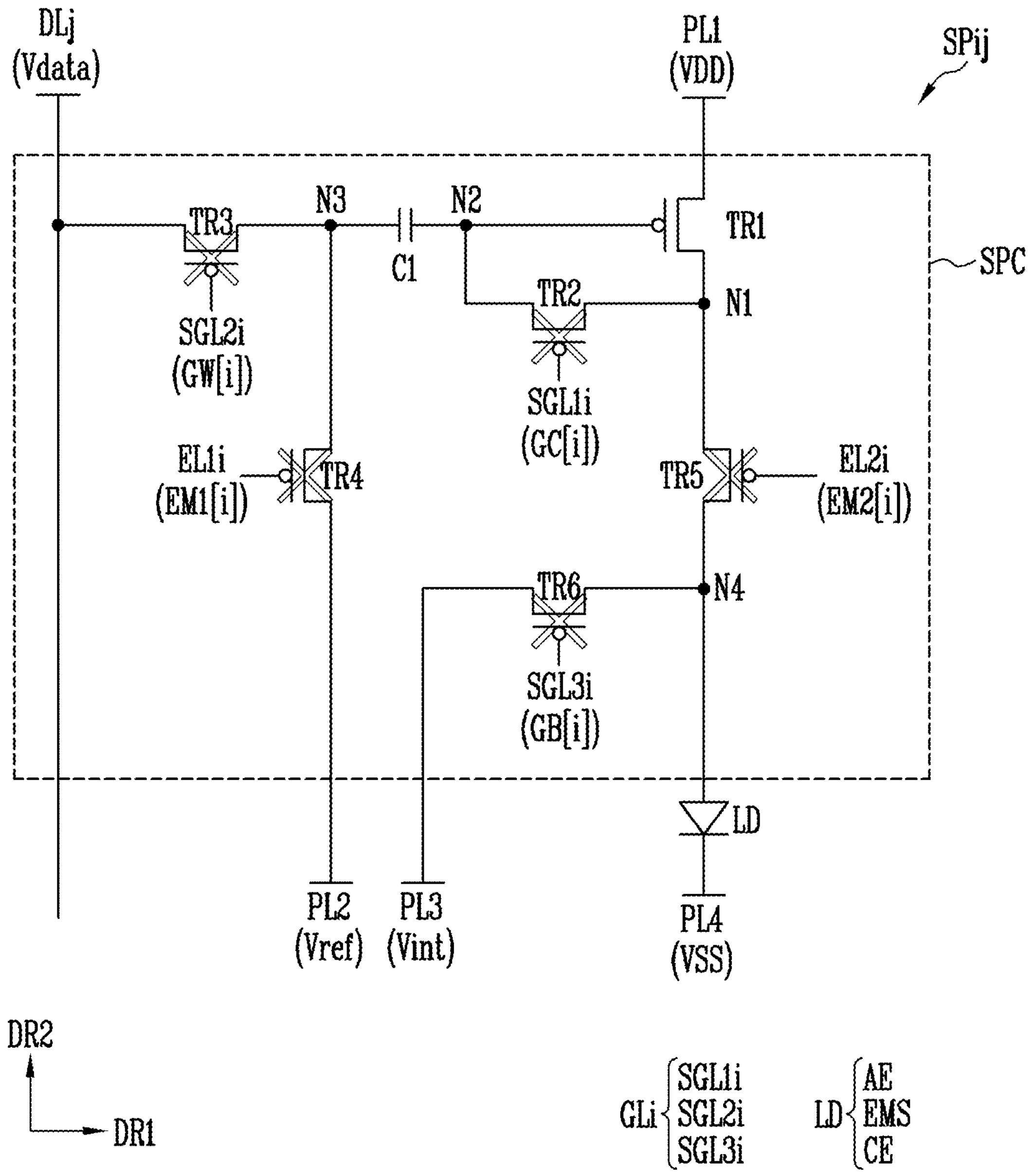

Referring to FIG. 9, the second transistor TR2 may maintain the turn-on state by the first gate signal GC[i] at the turn-off level supplied to the first sub-gate line SGL1*i* during the fifth period PR5.

The third transistor TR3 may maintain the turn-off state by the second gate signal GW[i] at the turn-off level supplied to the second sub-gate line SGL2*i* during the fifth period PR5.

The fourth transistor TR4 may maintain the turn-off state by the first emission control signal EM1[*i*] at the turn-off level supplied to the first emission control line EL1*i* during the fifth period PR5.

During the fifth period PR5, the fifth transistor TR5 may maintain the turn-off state by the second emission control signal EM2[*i*] at the turn-off level supplied to the second emission control line EL2*i*.

The sixth transistor TR6 may be turned off by the third gate signal GB[i] at the turn-off level (or high level) supplied to the third sub-gate line SGL3*i* during the fifth period PR5. When the sixth transistor TR6 is turned off, the electrical connection between the fourth node N4 and the third power line PL3 may be blocked.

Accordingly, during the fifth period PR5, the voltage of the second node N2 may be (VDD−|Vth|_TR1), and the voltage of the third node N3 may be a voltage corresponding to the data signal Vdata.

Figure 10:
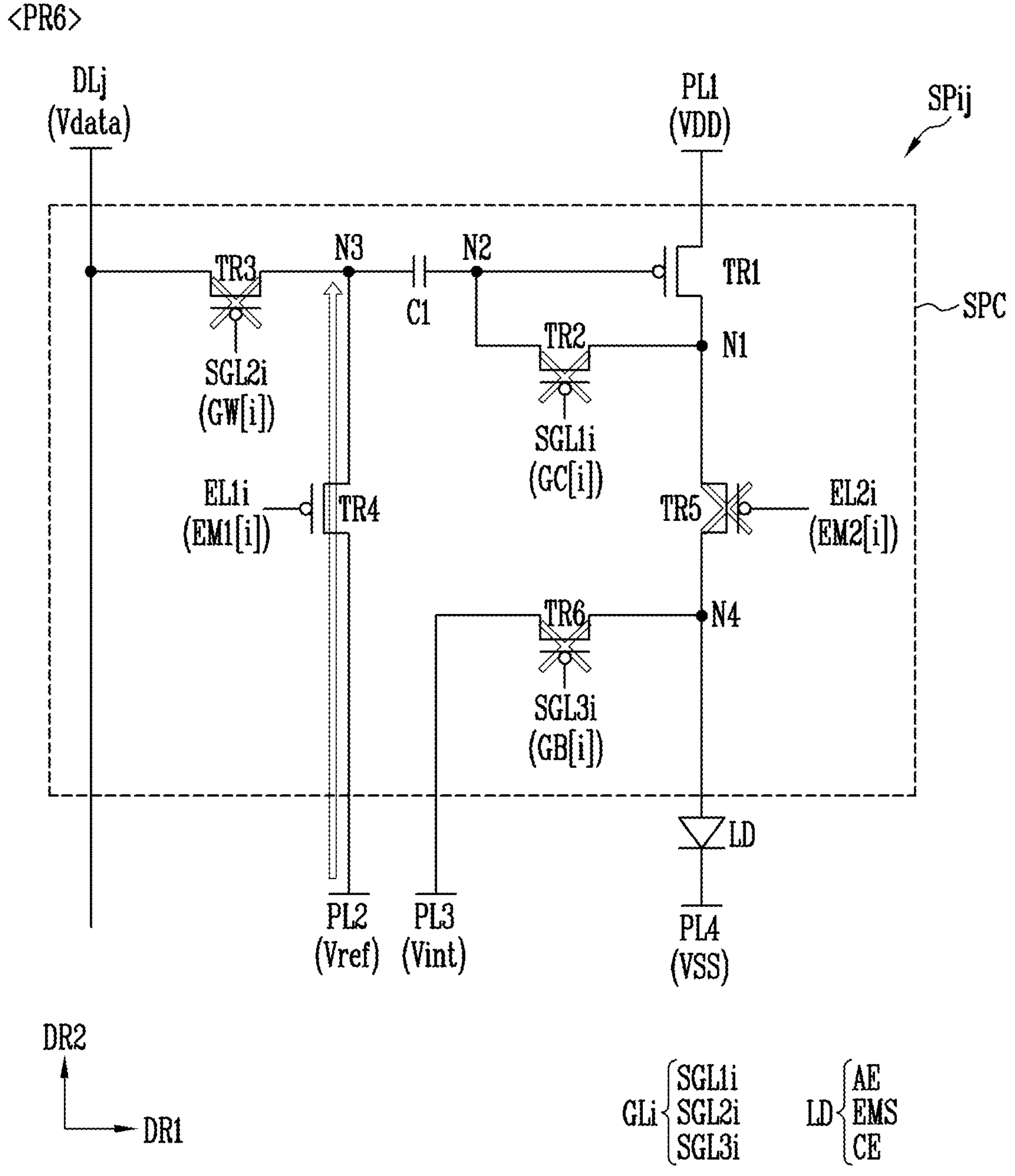

Referring to FIG. 10, the second transistor TR2 may maintain the turn-off state by the first gate signal GC[i] at the turn-off level supplied to the first sub-gate line SGL1*i* during the sixth period PR6. The second node N2 may be in a floating state.

The third transistor TR3 may maintain the turn-off state by the second gate signal GW[i] at the turn-off level supplied to the second sub-gate line SGL2*i* during the sixth period PR6.

The fourth transistor TR4 may be turned on by the first emission control signal EM1[*i*] at the turn-on level supplied to the first emission control line EL1*i* during the sixth period PR6. The reference voltage Vref may be applied to the third node N3.

The fifth transistor TR5 may maintain the turn-off state by the second emission control signal EM2[*i*] at the turn-off level supplied to the second emission control line EL2*i* during the sixth period PR6.

The sixth transistor TR6 may maintain the turn-off state by the third gate signal GB[i] at the turn-off level supplied to the third sub-gate line SGL3*i* during the sixth period PR6.

Accordingly, the reference voltage Vref may be applied to the third node N3. When the voltage of the third node N3 changes to the reference voltage Vref, the voltage of the second node N2 may change due to the coupling phenomenon of the first capacitor C1. The voltage of the second node N2 may change to (VDD−|Vth|_TR1−Vdata+Vref).

Figure 11:
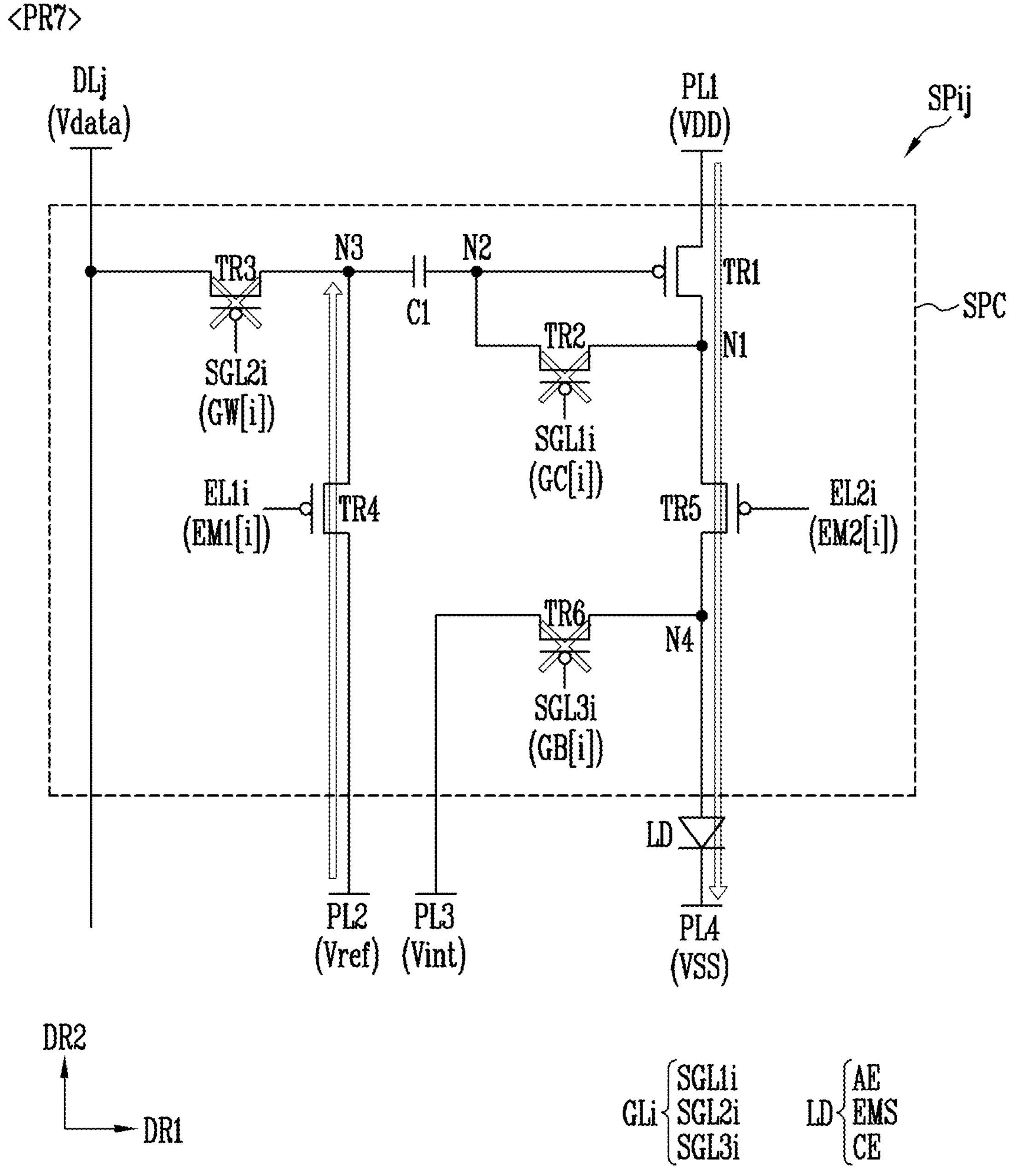

Referring to FIG. 11, the second transistor TR2 may maintain the turn-off state by the first gate signal GC[i] at the turn-off level supplied to the first sub-gate line SGL1*i* during the seventh period PR7.

The third transistor TR3 may maintain the turn-off state by the second gate signal GW[i] at the turn-off level supplied to the second gate line SGL2*i* during the seventh period PR7.

The fourth transistor TR4 may maintain the turn-on state by the first emission control signal EM1[*i*] at the turn-on level supplied to the first emission control line EL1*i* during the seventh period PR7.

The fifth transistor TR5 may be turned on by the second emission control signal EM2[*i*] supplied to the second emission control line EL2*i* during the seventh period PR7.

The sixth transistor TR6 may maintain the turn-off state by the third gate signal GB[i] at the turn-off level supplied to the third sub-gate line SGL3*i* during the seventh period PR7.

Accordingly, during the seventh period PR7, the voltage of the second node N2 may be (VDD−|Vth|_TR1−Vdata+Vref), and the voltage of the third node N3 may be the reference voltage Vref.

The gate electrode of the first transistor TR1 may be electrically connected to the second node N2, so the voltage (Vg) of the gate electrode of the first transistor TR1 may be the same (or substantially the same) as the voltage of the second node N2. The source electrode of the first transistor TR1 may be electrically connected to the first power line PL1, so the voltage (Vs) of the source electrode of the first transistor TR1 may be the first driving voltage VDD.

In the seventh period PR7, a driving current corresponding to the data signal Vdata may flow through the light emitting element LD. The size of the driving current flowing through the light emitting element LD may be determined by the voltage difference between the gate-source voltage (Vsg) and the threshold voltage |Vth|_TR1 of the first transistor TR1.

The gate-source voltage (Vsg) of the first transistor TR1 may be a value obtained by subtracting the voltage (Vg) of the gate electrode of the first transistor TR1 from the voltage (Vs) of the source electrode of the first transistor TR1. The gate-source voltage (Vsg) of the first transistor TR1 may be (|Vth|_TR1+Vdata−Vref), and the voltage difference between the gate-source voltage (Vsg) and the threshold voltage (|Vth|_TR1) of the first transistor TR1 may be (Vdata−Vref).

As a result, the change in the threshold voltage of the first transistor TR1 can be compensated, and a driving current free from changes in the threshold voltage can flow through the first transistor TR1. Accordingly, the display quality can be improved.

Figure 12:
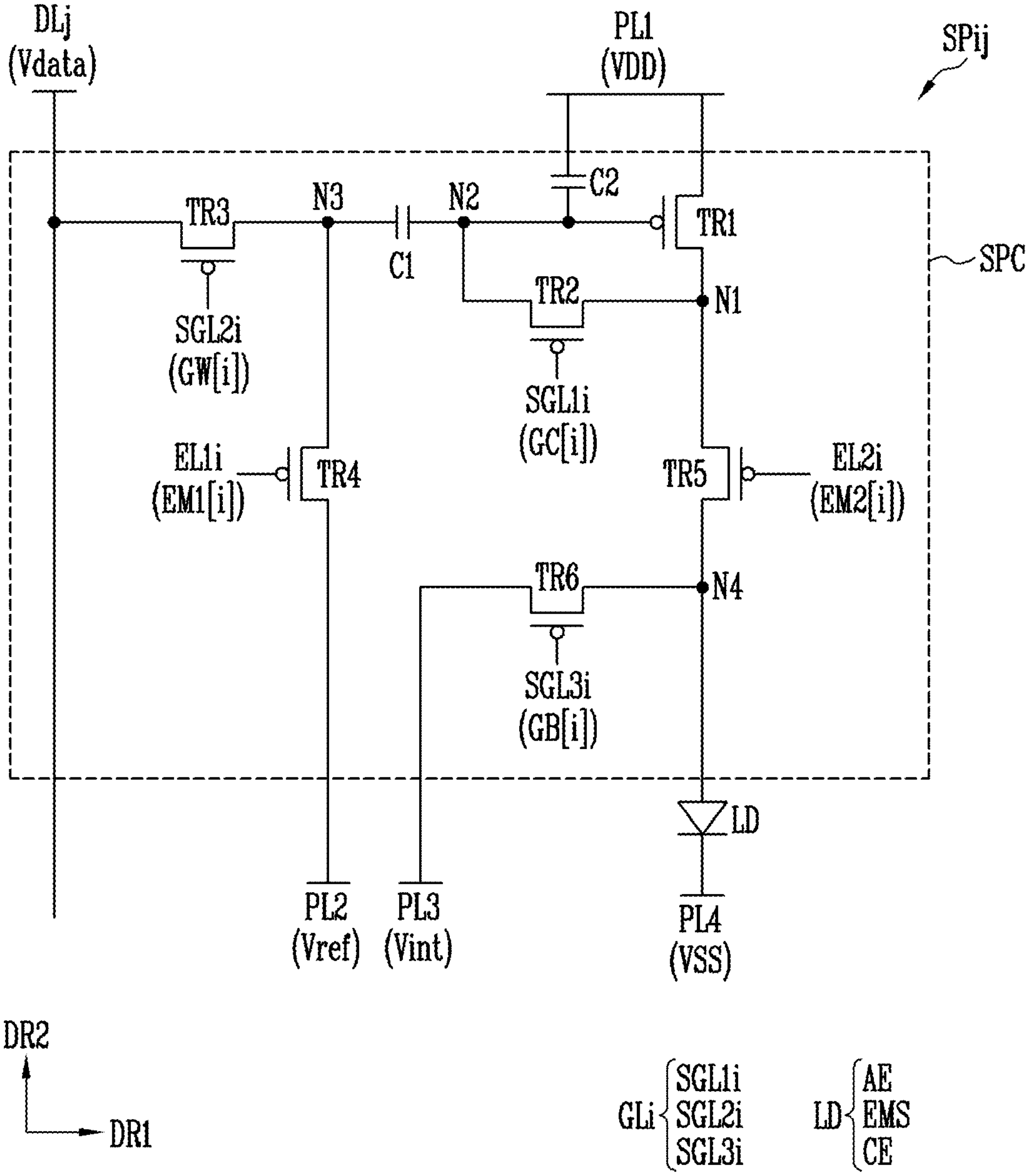
FIG. 12 is a circuit diagram showing another embodiment of the sub-pixel shown in FIG. 2.

FIG. 12 is a circuit diagram showing another embodiment of the sub-pixel shown in FIG. 2. In FIG. 12, the sub-pixel SPij arranged in the i-th row (i is an integer greater than or equal to 1 and less than or equal to m) and the j-th column (j is an integer greater than or equal to 1 and less than or equal to n) among the sub-pixels SP of FIG. 1, is shown as an example.

Referring to FIGS. 2 and 12, the sub-pixel SPij of FIG. 12 may further include a second capacitor C2 compared to the sub-pixel SPij of FIG. 3.

The configuration of the first to sixth transistors TR1 to TR6 and the first capacitor C1 in the sub-pixel SPij of FIG. 12, may be the same as the configuration thereof in the sub-pixel SPij of FIG. 3. Hereinafter, any repetitive detailed description of the first to sixth transistors TR1 to TR6 and the first capacitor C1, which are the same as those described above with reference to FIG. 3 will be omitted.

In such an embodiment, the first electrode of the second capacitor C2 may be connected (e.g., electrically connected)

to the second node N2, and the second electrode thereof may be connected (e.g., electrically connected) to the first power line PL1 to which the first driving voltage VDD is applied.

FIGS. 13 to 19 are circuit diagrams showing an operation process of the sub-pixel of FIG. 12 depending on signals of FIG. 4. In FIGS. 13 to 19, the operation process of the sub-pixels SPij arranged in the i-th row (i is an integer greater than or equal to 1 and less than or equal to m) and the j-th column (j is an integer greater than or equal to 1 and less than n) among the sub-pixels SP of FIG. 1, is shown as an example.

Figure 13:
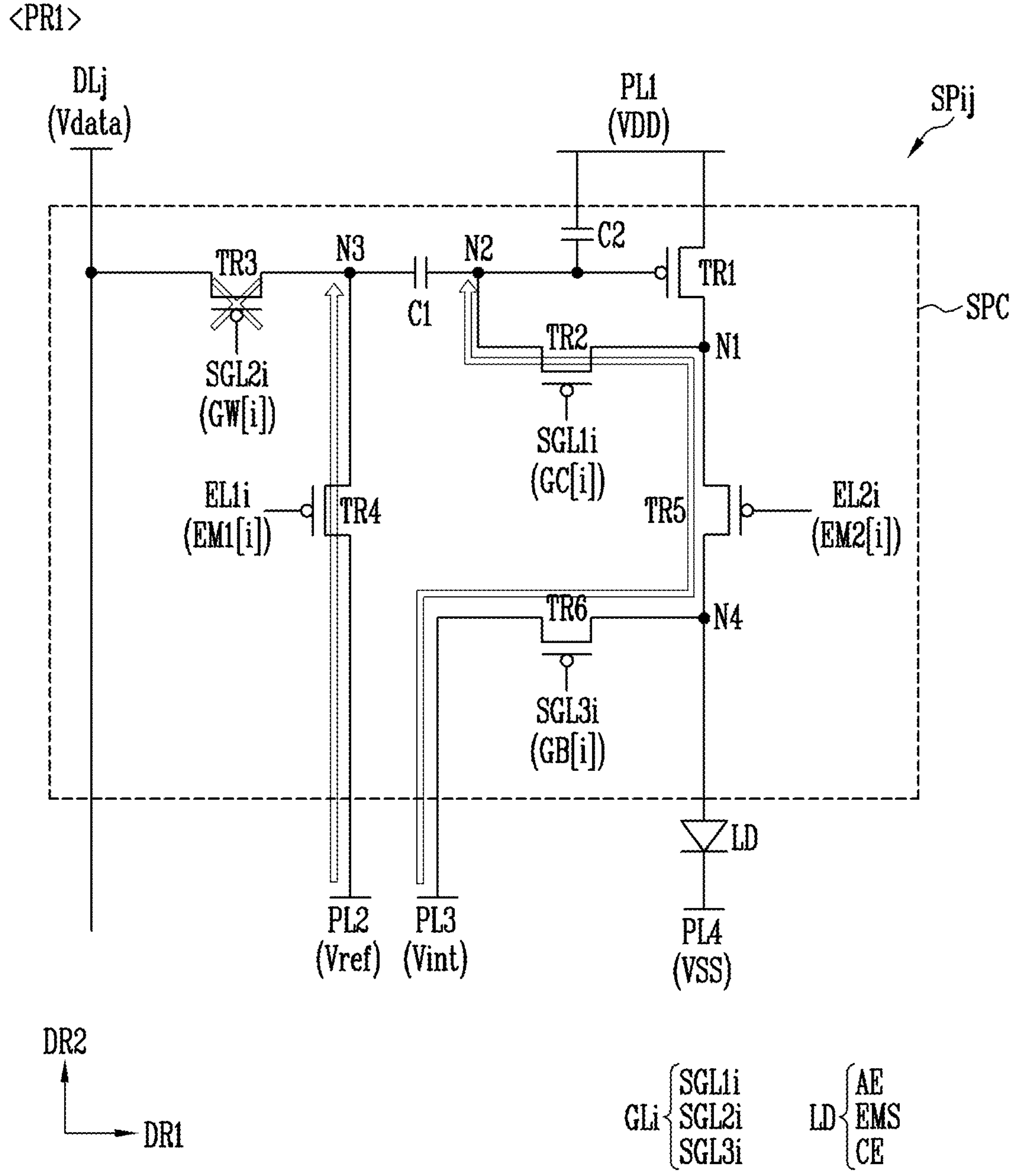
FIGS. 13 to 19 are circuit diagrams showing an operation process of the sub-pixel of FIG. 12 depending on signals of FIG. 4.

Referring to FIG. 13, the second transistor TR2 may be turned on by the first gate signal GC[i] at the turn-on level supplied to the first sub-gate line SGL1*i* during the first period PR1.

The third transistor TR3 may be turned off by the second gate signal GW[i] at the turn-off level (or high level) supplied to the second sub-gate line SGL2*i* during the first period PR1. When the third transistor TR3 is turned off, the electrical connection between the j-th data line DLj and the third node N3 may be blocked.

The fourth transistor TR4 may be turned on by the first emission control signal EM1[*i*] at the turn-on level supplied to the first emission control line EL1*i* during the first period PR1.

The fifth transistor TR5 may be turned on by the second emission control signal EM2[*i*] at the turn-on level supplied to the second emission control line EL2*i* during the first period PR1.

The sixth transistor TR6 may be turned on by the third gate signal GB[i] at the turn-on level supplied to the third sub-gate line SGL3*i* during the first period PR1.

Accordingly, the initialization voltage Vint may be applied to the second node N2 and the reference voltage Vref may be applied to the third node N3 during the first period PR1.

Figure 14:
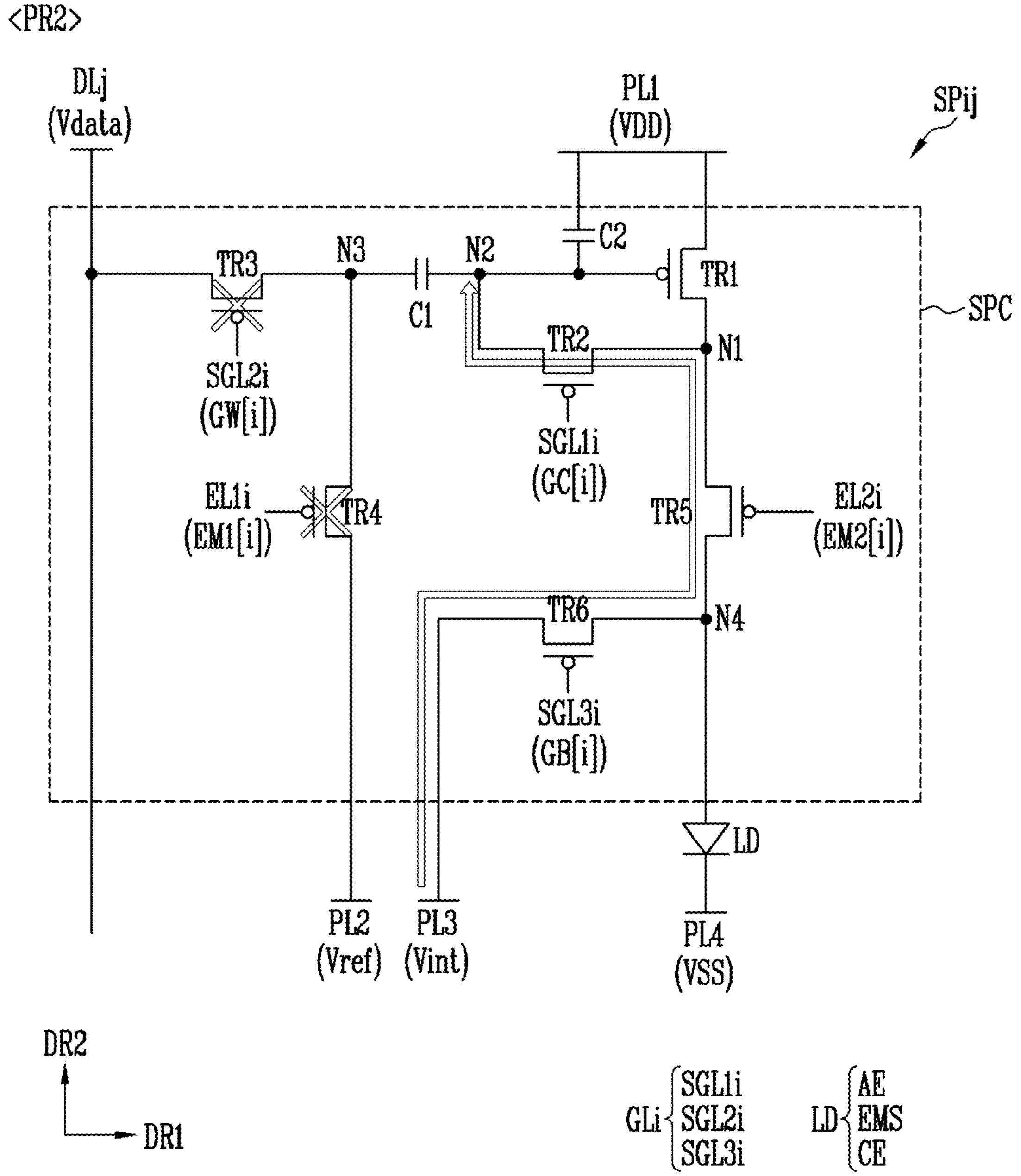

Referring to FIG. 14, the second transistor TR2 may maintain a turn-on state by the first gate signal GC[i] at the turn-on level supplied to the first sub-gate line SGL1*i* during the second period PR2.

The third transistor TR3 may maintain a turn-off state by the second gate signal GW[i] at the turn-off level supplied to the second sub-gate line SGL2*i* during the second period PR2.

The fourth transistor TR4 may be turned off by the first emission control signal EM1[*i*] at the turn-off level (or high level) supplied to the first emission control line EL1*i* during the second period PR2. When the fourth transistor TR4 is turned off, the electrical connection between the second power line PL2 and the third node N3 may be blocked.

The fifth transistor TR5 may maintain the turn-on state by the second emission control signal EM2[*i*] at the turn-on level supplied to the second emission control line EL2*i* during the second period PR2.

The sixth transistor TR6 may maintain the turn-on state by the third gate signal GB[i] at the turn-on level supplied to the third sub-gate line SGL3*i* during the second period PR2.

Accordingly, the voltage of the second node N2 during the second period PR2 may be the initialization voltage Vint, and the reference voltage Vref may be applied to the third node N3 during the second period PR2.

Figure 15:
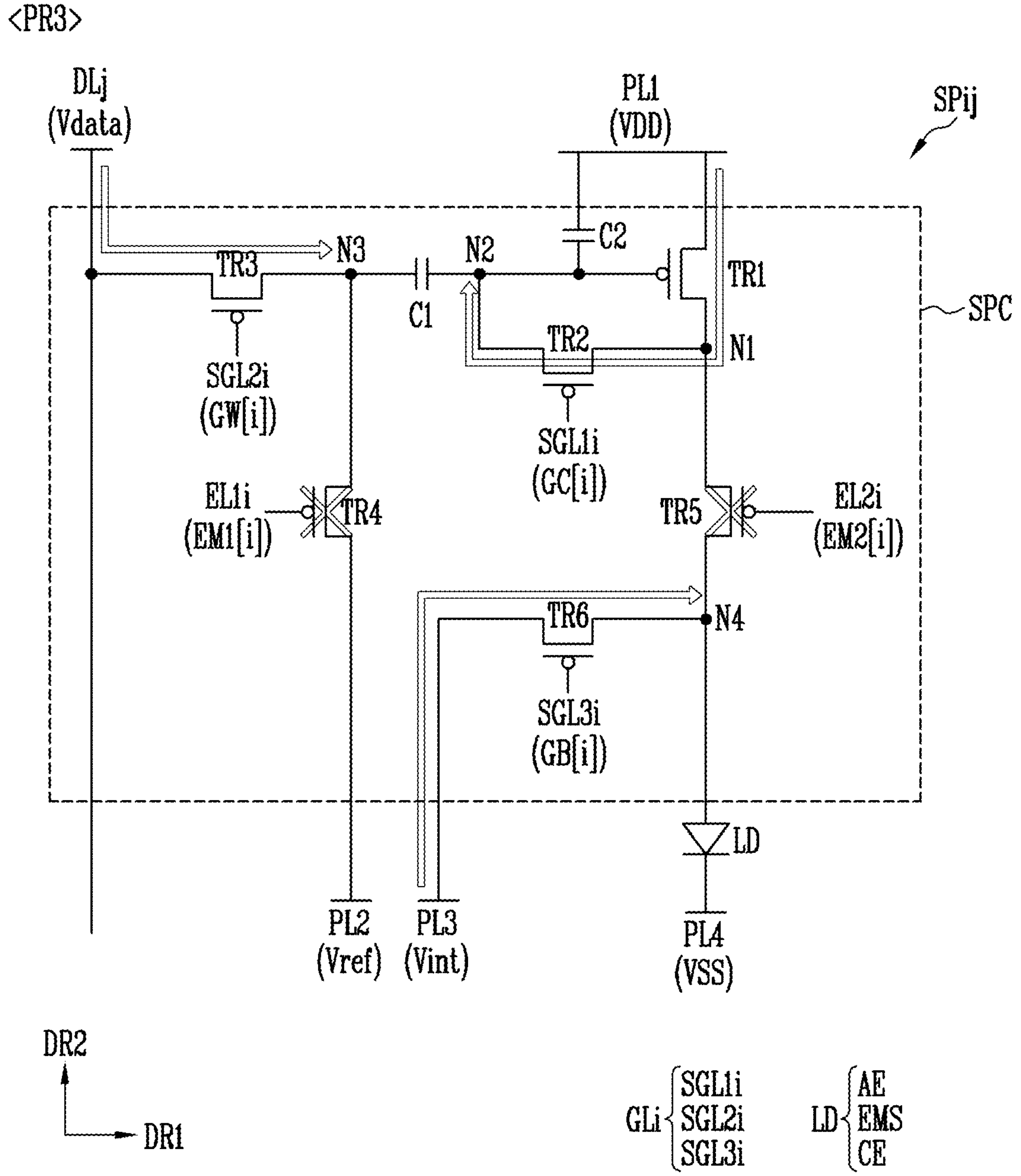

Referring to FIG. 15, the second transistor TR2 may maintain the turn-on state by the first gate signal GC[i] at the turn-on level supplied to the first sub-gate line SGL1*i* during the third period PR3.

The third transistor TR3 may be turned on by the second gate signal GW[i] at the turn-on level supplied to the second sub-gate line SGL2*i* during the third period PR3.

The fourth transistor TR4 may maintain the turn-off state by the first emission control signal EM1[*i*] at the turn-off level supplied to the i-th emission control line ELi during the third period PR3.

The fifth transistor TR5 may be turned off by the second emission control signal EM2[*i*] at the turn-off level (or high level) supplied to the second emission control line EL2*i* during the third period PR3. When the fifth transistor TR5 is turned off, the electrical connection between the first node N1 and the fourth node N4 may be blocked.

The sixth transistor TR6 may maintain the turn-on state by the third gate signal GB[i] at the turn-on level supplied to the third sub-gate line SGL3*i* during the third period PR3.

Accordingly, during the third period PR3, the voltage of the second node N2 may be (VDD−|Vth|_TR1), and the voltage of the third node N3 may be a voltage corresponding to the data signal Vdata.

Here, |Vth|_TR1 is the absolute value of the threshold voltage of the first transistor TR1.

Figure 16:
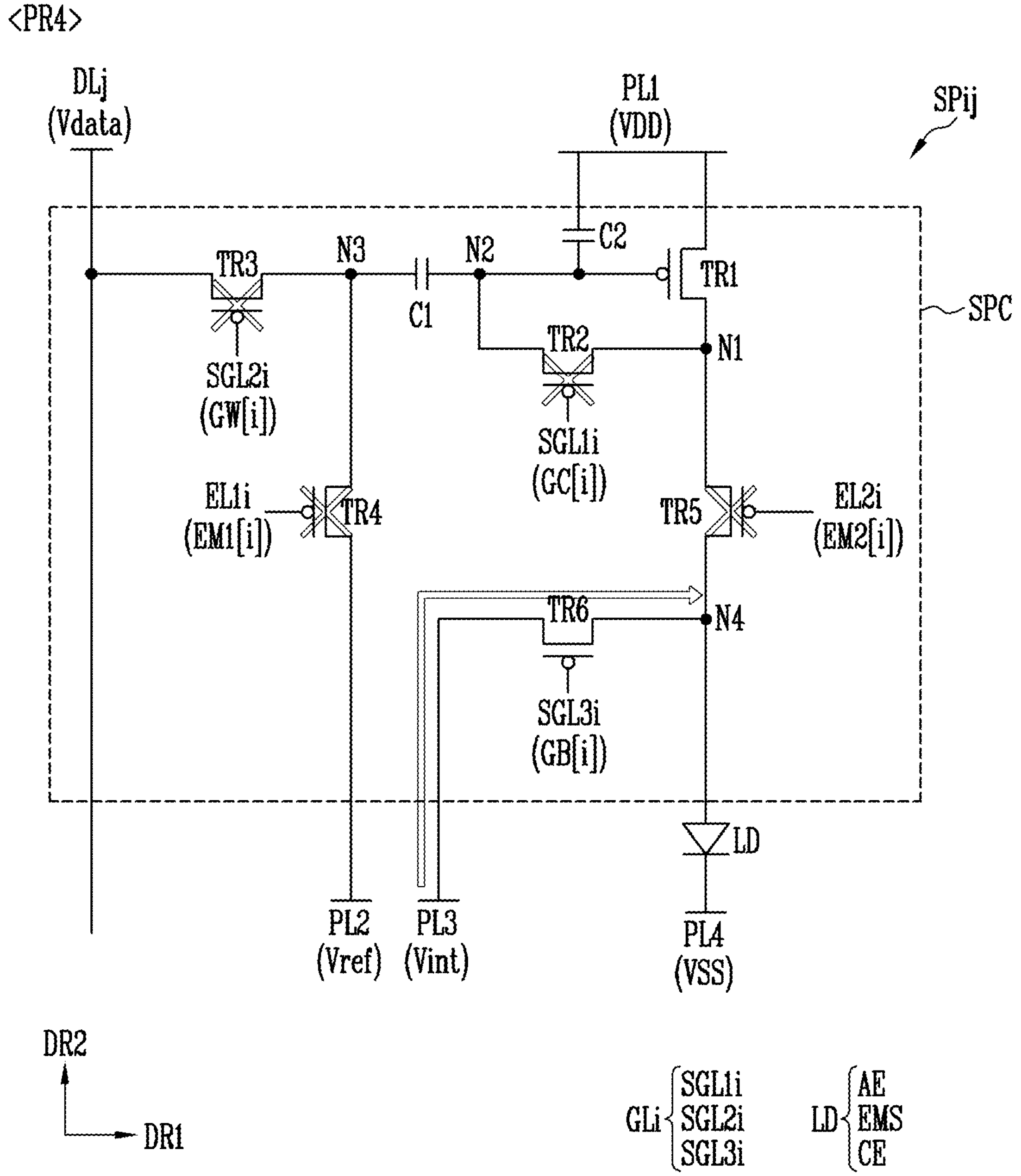

Referring to FIG. 16, the second transistor TR2 may be turned off by the first gate signal GC[i] at the turn-off level (or high level) supplied to the first sub-gate line SGL1*i* during the fourth period PR4. When the second transistor TR2 is turned off, the electrical connection between the first node N1 and the second node N2 may be blocked.

The third transistor TR3 may be turned off by the second gate signal GW[i] at the turn-off level supplied to the second sub-gate line SGL2*i* during the fourth period PR4. When the third transistor TR3 is turned off, the electrical connection between the j-th data line DLj and the third node N3 may be blocked.

The fourth transistor TR4 may maintain the turn-off state by the first emission control signal EM1[*i*] at the turn-off level supplied to the first emission control line EL1*i* during the fourth period PR4.

The fifth transistor TR5 may maintain the turn-off state by the second emission control signal EM2[*i*] at the turn-off level supplied to the second emission control line EL2*i* during the fourth period PR4.

The sixth transistor TR6 may maintain the turn-on state by the third gate signal GB[i] at the turn-on level supplied to the third sub-gate line SGL3*i* during the fourth period PR4.

Accordingly, during the fourth period PR4, the voltage of the second node N2 may be (VDD−|Vth|_TR1), and the voltage of the third node N3 may be a voltage corresponding to the data signal Vdata.

During the fourth period PR4, the initialization voltage Vint may be supplied to the fourth node N4. The voltage difference between the initialization voltage Vint and the second driving voltage VSS may be less than the threshold voltage of the light emitting element LD.

Figure 17:
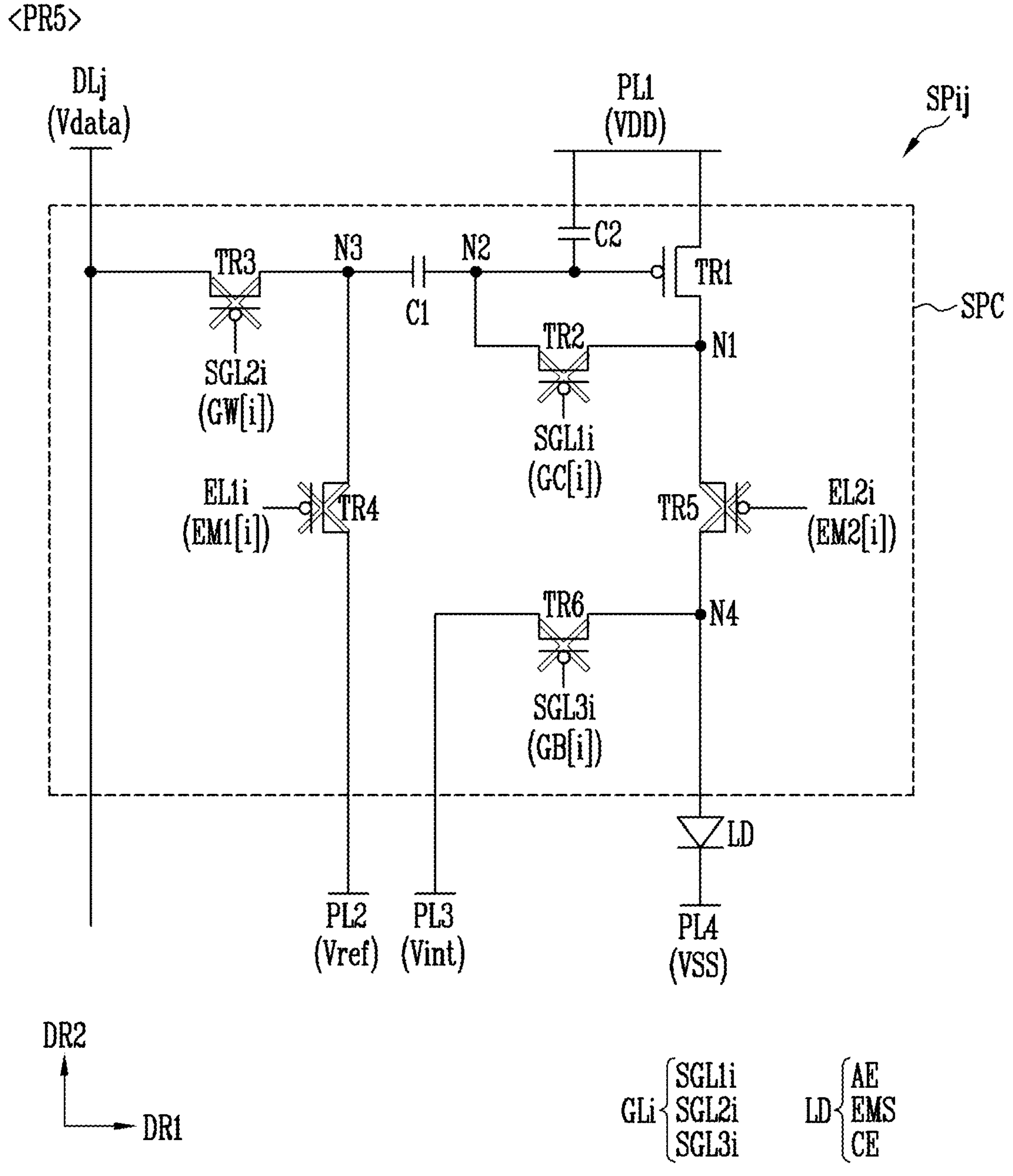

Referring to FIG. 17, the second transistor TR2 may maintain the turn-off state by the first gate signal GC[i] at the turn-off level supplied to the first sub-gate line SGL1*i* during the fifth period PR5.

The third transistor TR3 may maintain the turn-off state by the second gate signal GW[i] at the turn-off level supplied to the second sub-gate line SGL2*i* during the fifth period PR5.

The fourth transistor TR4 may maintain the turn-off state by the first emission control signal EM1[*i*] at the turn-off level supplied to the first emission control line EL1*i* during the fifth period PR5.

During the fifth period PR5, the fifth transistor TR5 may maintain the turn-off state by the second emission control signal EM2[*i*] at the turn-off level supplied to the second emission control line EL2*i*.

The sixth transistor TR6 may be turned off by the third gate signal GB[i] at the turn-off level (or high level) supplied to the third sub-gate line SGL3*i* during the fifth period PR5. When the sixth transistor TR6 is turned off, the electrical connection between the fourth node N4 and the third power line PL3 may be blocked.

Accordingly, during the fifth period PR5, the voltage of the second node N2 may be (VDD−|Vth|_TR1), and the voltage of the third node N3 may be a voltage corresponding to the data signal Vdata.

Figure 18:
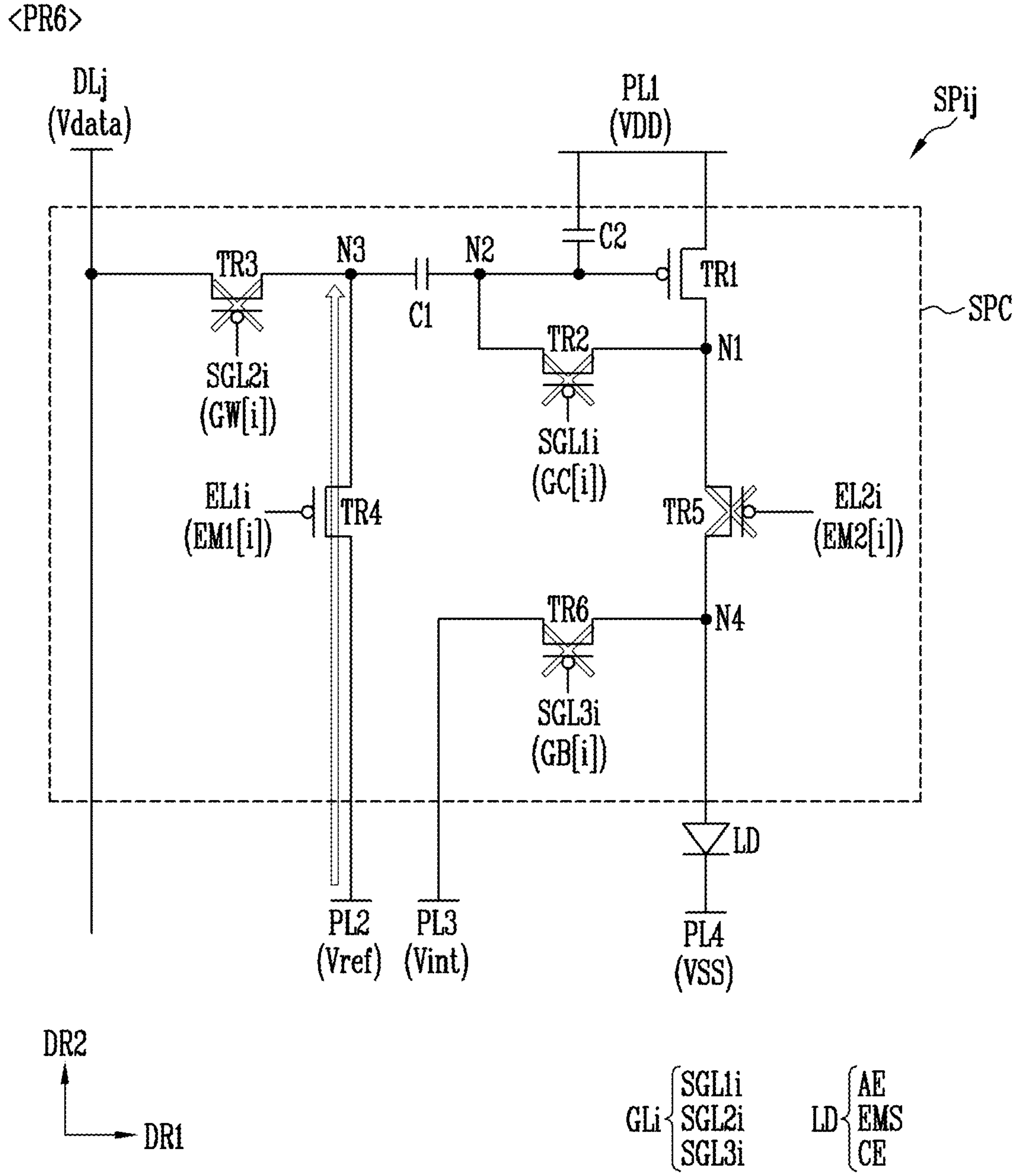

Referring to FIG. 18, the second transistor TR2 may maintain the turn-off state by the first gate signal GC[i] at the turn-off level supplied to the first sub-gate line SGL1*i* during the sixth period PR6. The second node N2 may be in a floating state.

The third transistor TR3 may maintain the turn-off state by the second gate signal GW[i] at the turn-off level supplied to the second sub-gate line SGL2*i* during the sixth period PR6.

The fourth transistor TR4 may be turned on by the first emission control signal EM1[*i*] at the turn-on level supplied to the first emission control line EL1*i* during the sixth period PR6. The reference voltage Vref may be applied to the third node N3.

The fifth transistor TR5 may maintain the turn-off state by the second emission control signal EM2[*i*] at the turn-off level supplied to the second emission control line EL2*i* during the sixth period PR6.

The sixth transistor TR6 may maintain the turn-off state by the third gate signal GB[i] at the turn-off level supplied to the third sub-gate line SGL3*i* during the sixth period PR6.

Accordingly, the reference voltage Vref may be applied to the third node N3. When the voltage of the third node N3 changes to the reference voltage Vref, the voltage of the second node N2 may change due to the coupling phenomenon of the first capacitor C1. The voltage of the second node N2 may change up to $$VDD-|Vth|\_\mathrm{TR1}-\frac{C1}{C1+C2}\times(Vdata-Vref).$$

Figure 19:
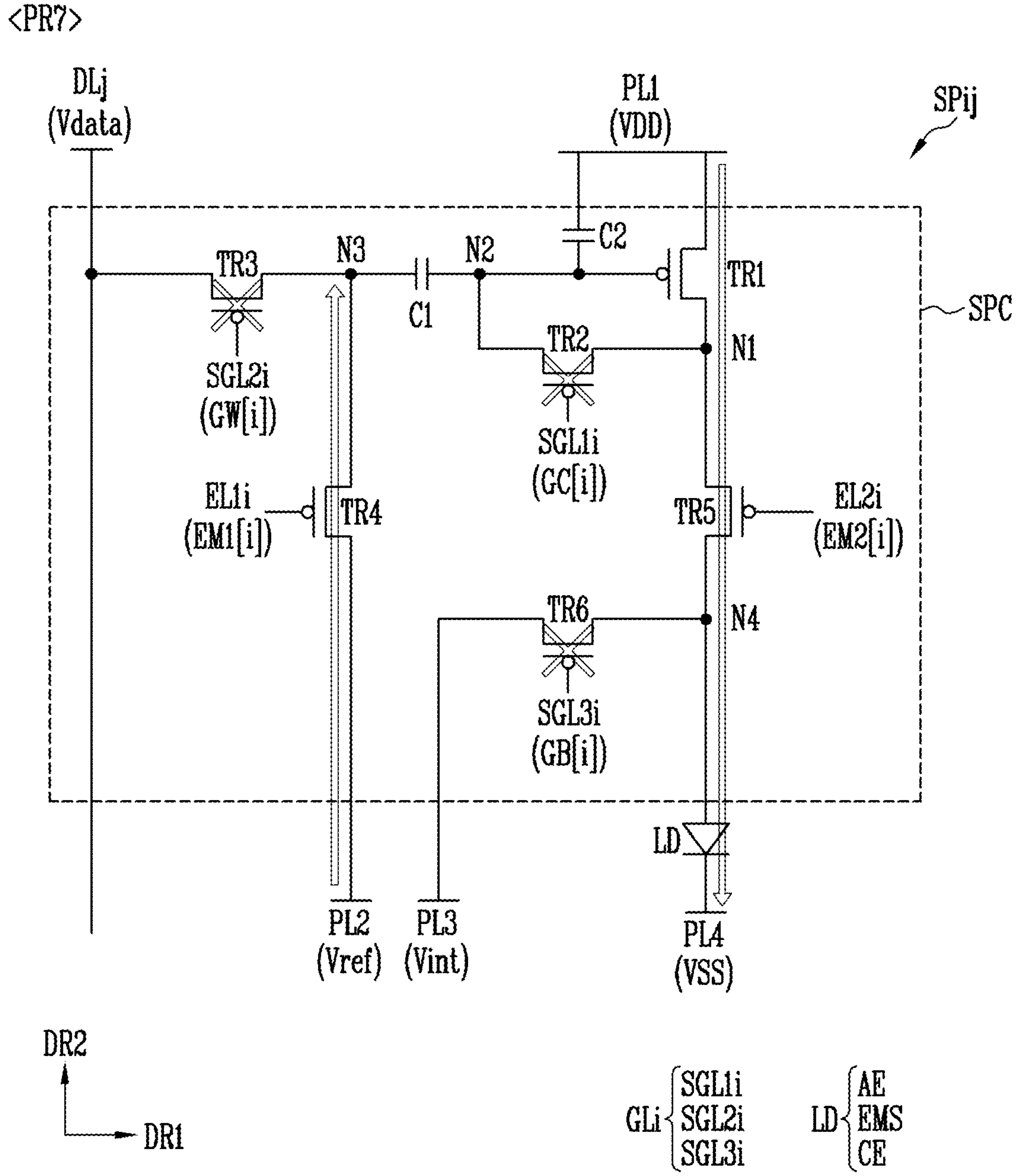

Referring to FIG. 19, the second transistor TR2 may maintain the turn-off state by the first gate signal GC[i] at the turn-off level supplied to the first sub-gate line SGL1*i* during the seventh period PR7.

The third transistor TR3 may maintain the turn-off state by the second gate signal GW[i] at the turn-off level supplied to the second gate line SGL2*i* during the seventh period PR7.

The fourth transistor TR4 may maintain the turn-on state by the first emission control signal EM1[*i*] at the turn-on level supplied to the first emission control line EL1*i* during the seventh period PR7.

The fifth transistor TR5 may be turned on by the second emission control signal EM2[*i*] supplied to the second emission control line EL2*i* during the seventh period PR7.

The sixth transistor TR6 may maintain the turn-off state by the third gate signal GB[i] at the turn-off level supplied to the third sub-gate line SGL3*i* during the seventh period PR7.

As a result, the voltage of the second node N2 may be $$VDD-|Vth|\_\mathrm{TR1}-\frac{C1}{C1+C2}\times(Vdata-Vref)$$

during the seventh period PR7 and the voltage of the third node N3 may be the reference voltage Vref.

The gate electrode of the first transistor TR1 may be electrically connected to the second node N2, so the voltage (Vg) of the gate electrode of the first transistor TR1 may be the same (or substantially the same) as the voltage of the second node N2. The source electrode of the first transistor TR1 may be electrically connected to the first power line PL1, so the voltage (Vs) of the source electrode of the first transistor TR1 may be the first driving voltage VDD.

In the seventh period PR7, a driving current corresponding to the data signal Vdata may flow through the light emitting element LD. The size of the driving current flowing through the light emitting element LD may be determined by the voltage difference between the gate-source voltage Vsg and the threshold voltage |Vth|_TR1 of the first transistor TR1.

The gate-source voltage (Vsg) of the first transistor TR1 may be a value obtained by subtracting the voltage (Vg) of the gate electrode of the first transistor TR1 from the voltage (Vs) of the source electrode of the first transistor TR1. The gate-source voltage (Vsg) of the first transistor TR1 may be $$|Vth|\_\mathrm{TR1}+\frac{C1}{C1+C2}\times(Vdata-Vref),$$

and the voltage difference between the gate-source voltage (Vsg) and the threshold voltage (|Vth|_TR1) of the first transistor TR1 may be $$\frac{C1}{C1+C2}\times(Vdata-Vref).$$

As a result, the change in the threshold voltage of the first transistor TR1 can be compensated, and a driving current free from changes in the threshold voltage can flow through the first transistor TR1. Accordingly, the display quality can be improved.

In such an embodiment, a relatively uniform driving current may flow through the light emitting element LD.

In such an embodiment, the data signal Vdata may be used over a wider range. Accordingly, the display quality can be improved.

Figure 20:
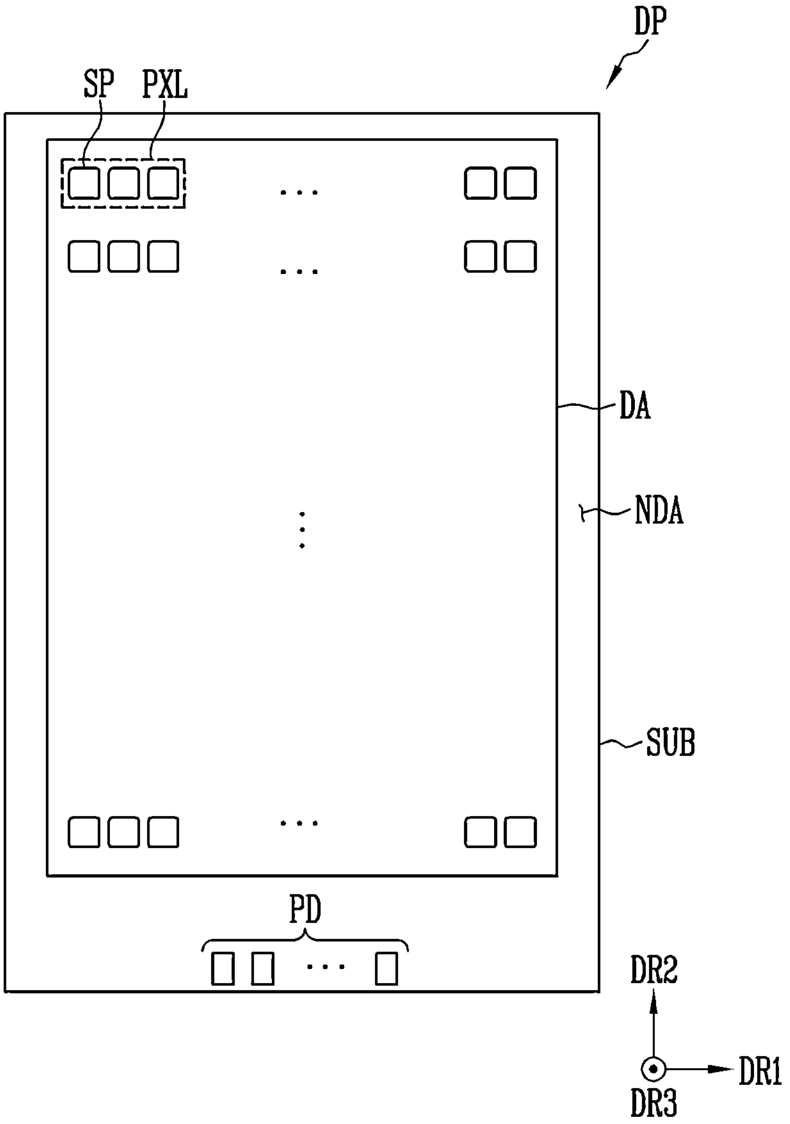
FIG. 20 is a plan view showing an embodiment of the display panel of FIG. 1.

FIG. 20 is a plan view showing an embodiment of the display panel of FIG. 1.

Referring to FIG. 20, an embodiment DP of the display panel 110 of FIG. 1 may include a display area DA and a non-display area NDA. The display panel DP displays an image through the display area DA. The non-display area NDA may be disposed around the display area DA.

The display panel DP may include a substrate SUB, sub-pixels SP, and pads PD.

In an embodiment where the display panel DP is used as a display screen of a head mounted display (HMD), a virtual reality (VR) device, a mixed reality (MR) device, an augmented reality (AR) devices, or the like, the display panel DP may be disposed very close to the user's eyes. In such an embodiment, sub-pixels SP with relatively high integration are desired. To increase the integration of the sub-pixels SP, the substrate SUB may be provided as a silicon substrate. The sub-pixels SP and/or display panel DP may be formed on the substrate SUB, which is a silicon substrate. The display device 100 (see FIG. 1) including the display panel DP formed on the substrate SUB, which is a silicon substrate, may be referred to as an organic light emitting diode (OLED) on silicon (OLEDoS) display device.

The sub-pixels SP are disposed in the display area DA on the substrate SUB. The sub-pixels SP may be arranged in a matrix form in the first direction DR1 and the second direction DR2 crossing the first direction DR1. However, the embodiments are not limited thereto. In an embodiment, for example, the sub-pixels SP may be arranged in a zigzag pattern in the first direction DR1 and the second direction DR2. In an embodiment, for example, the sub-pixels SP may be arranged in a PENTILE™ shape. The first direction DR1 may be a row direction, and the second direction DR2 may be a column direction.

Two or more sub-pixels among the plurality of sub-pixels SP may constitute one pixel PXL.

Components for controlling the sub-pixels SP may be disposed in the non-display area NDA on the substrate SUB. In an embodiment, for example, lines connected to the sub-pixels SP such as the first to m-th gate lines GL1 to GLm and the first to n-th data lines DL1 to DLn of FIG. 1 may be disposed on the non-display area NDA.

At least one selected from the gate driver 120, the data driver 130, the voltage generator 140, the controller 150, and the temperature sensor 160 of FIG. 1 may be integrated in the non-display area NDA of the display panel DP. In embodiments, the gate driver 120 of FIG. 1 may be mounted on the display panel DP and disposed in the non-display area NDA. In other embodiments, the gate driver 120 may be implemented as an integrated circuit separate from the display panel DP. In embodiments, the temperature sensor 160 of FIG. 1 may be disposed in the non-display area NDA to detect the temperature of the display panel DP.

Pads PD may be disposed in the non-display area NDA on the substrate SUB. The pads PD may be electrically connected to the sub-pixels SP through the lines. In an embodiment, for example, the pads PD may be connected to the sub-pixels SP through the first to n-th data lines DL1 to DLn.

The pads PD may interface the display panel DP to other components of the display device 100 (see FIG. 1). In embodiments, voltages and signals used for the operation of components included in the display panel DP may be provided from the driver integrated circuit DIC of FIG. 1 through the pads PD. In an embodiment, for example, the first to n-th data lines DL1 to DLn may be connected to the driver integrated circuit DIC through the pads PD. In an embodiment, for example, the first and second driving voltages VDD and VSS may be received from the driver integrated circuit DIC through the pads PD. In an embodiment, for example, where the gate driver 120 is mounted on the display panel DP, the gate control signal GCS may be transmitted from the driver integrated circuit DIC to the gate driver 120 through the pads PD.

In embodiments, the circuit board may be electrically connected to the pads PD using a conductive adhesive member such as an anisotropic conductive film. In such embodiments, the circuit board may be a flexible circuit board (FPCB) or a flexible film including or made of a flexible material. The driver integrated circuit DIC may be mounted on the circuit board and electrically connected to the pads PD.

In embodiments, the display area DA may have various shapes. The display area DA may have a closed loop shape including straight and/or curved sides. In an embodiment, for example, the display area DA may have shapes such as a polygon, circle, semicircle, or ellipse.

In embodiments, the display panel DP may have a flat display surface. In other embodiments, the display panel DP may have a display surface that is at least partially round. In embodiments, the display panel DP may be bendable, foldable, or rollable. In such embodiments, the display panel DP and/or the substrate SUB may include materials with flexible properties.

Figure 21:
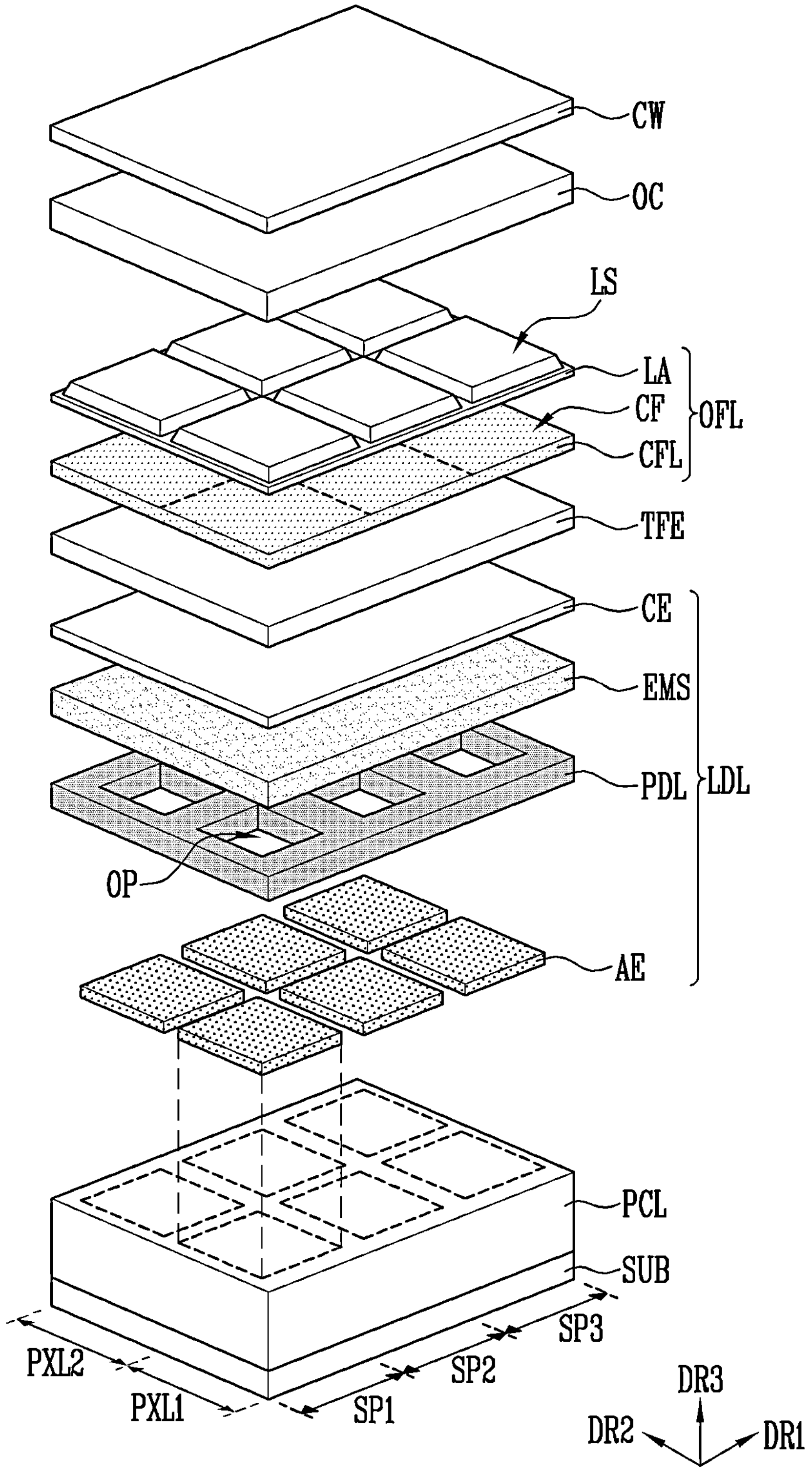
FIG. 21 is an exploded perspective view showing a portion of the display panel of FIG. 20.

FIG. 21 is an exploded perspective view showing a portion of the display panel of FIG. 20. In FIG. 21, a portion of the display panel DP corresponding to two pixels PXL1 and PXL2 among the pixels PXL of FIG. 20 is schematically shown for clarity and concise description. Portions of the display panel DP corresponding to the remaining pixels may be configured similarly.

Referring to FIGS. 20 and 21, in an embodiment of the display panel, each of the first and second pixels (PXL1 and PXL2) may include first to third sub-pixels (SP1, SP2, and SP3). However, the embodiments are not limited thereto. In an embodiment, for example, each of the first and second pixels PXL1 and PXL2 may include four sub-pixels or two sub-pixels.

In an embodiment, as shown in FIG. 21, the first to third sub-pixels SP1, SP2, and SP3 may have quadrangle shapes and a same size as each other when viewed from the third direction DR3 crossing the first and second directions DR1 and DR2. However, the embodiments are not limited thereto. In embodiments, the first to third sub-pixels SP1, SP2, and SP3 may be modified to have various shapes.

The display panel DP may include a substrate SUB, a pixel circuit layer PCL, a light emitting element layer LDL, an encapsulation layer TFE, an optical functional layer OFL, an overcoat layer OC, and a cover window CW.

In embodiments, the substrate SUB may include a silicon wafer substrate formed using a semiconductor process. The substrate SUB may include a semiconductor material suitable for forming circuit elements. In an embodiment, for example, the semiconductor material may include silicon, germanium, and/or silicon-germanium. The substrate SUB may be provided from a bulk wafer, an epitaxial layer, a silicon on insulator (SOI) layer, a semiconductor on insulator (SeOI) layer, or the like. In other embodiments, the substrate SUB may include a glass substrate. In other embodiments, the substrate SUB may include a polyimide (PI) substrate.

A pixel circuit layer PCL may be disposed on the substrate SUB. The substrate SUB and/or the pixel circuit layer PCL may include insulating layers and conductive patterns disposed between the insulating layers. The conductive patterns of the pixel circuit layer PCL may function as at least a portion of circuit elements, lines, etc. The conductive patterns may include copper, but embodiments are not limited thereto.

The circuit elements may include a sub-pixel circuit SPC (see FIG. 2) for each of the first to third sub-pixels SP1, SP2, and SP3. The sub-pixel circuit SPC may include transistors and one or more capacitors. Each transistor may include a semiconductor portion including a source region, a drain region, and a channel region, and a gate electrode overlapping the semiconductor portion. In embodiments, where the substrate SUB is provided as a silicon substrate, the semiconductor portion may be included in the substrate SUB, and the gate electrode may be included in the pixel circuit layer PCL as a conductive pattern of the pixel circuit layer PCL. In embodiments, where the substrate SUB is provided as a glass substrate or a PI substrate, the semiconductor portion and the gate electrode may be included in the pixel circuit layer PCL. Each capacitor may include electrodes spaced apart from each other. In an embodiment, for example, each capacitor may include electrodes spaced apart from each other on a plane defined by the first and second directions DR1 and DR2. In an embodiment, for example, each capacitor may include electrodes spaced apart from each other in the third direction DR3 with an insulating layer interposed therebetween.

Lines of the pixel circuit layer PCL may include signal lines connected to each of the first to third sub-pixels SP1, SP2, and SP3, for example, a gate line, an emission control line, a data line, and the like.

The light emitting element layer LDL may include anode electrodes AE, a pixel defining layer PDL, a light emitting structure EMS, and a cathode electrode CE.

The anode electrodes AE may be disposed on the pixel circuit layer PCL. The anode electrodes AE may contact circuit elements of the pixel circuit layer PCL. The anode electrodes AE may include an opaque conductive material capable of reflecting light, but embodiments are not limited thereto.

A pixel defining layer PDL may be disposed on the anode electrodes AE. The pixel defining layer PDL may be provided with an opening OP defined therethrough to expose a portion of each of the anode electrodes AE. The opening OP of the pixel defining layer PDL may be understood as emission areas corresponding to the first to third sub-pixels SP1 to SP3, respectively.

In embodiments, the pixel defining layer PDL may include an inorganic material. In such embodiments, the pixel defining layer PDL may include a plurality of stacked inorganic layers. In an embodiment, for example, the pixel defining layer PDL may include silicon oxide (SiOx) or silicon nitride (SiNx). In other embodiments, the pixel defining layer PDL may include an organic material. However, the material of the pixel defining layer PDL is not limited thereto.

The light emitting structure EMS may be disposed on the anode electrodes AE exposed by the opening OP of the pixel defining layer PDL. The light emitting structure EMS may include a light emitting layer configured to generate light, an electron transport layer configured to transport electrons, and a hole transport layer configured to transport holes.

In embodiments, the light emitting structure EMS may fill the opening OP of the pixel defining layer PDL and may be entirely disposed on the pixel defining layer PDL. In such embodiments, the light emitting structure EMS may extend over the first to third sub-pixels SP1 to SP3. In such embodiments, at least some of layers in the light emitting structure EMS may be disconnected or bent at the boundaries between the first to third sub-pixels SP1 to SP3. However, the embodiments are not limited thereto. In an embodiment, for example, portions of the light emitting structure EMS corresponding to the first to third sub-pixels SP1 to SP3 are separated from each other, and each thereof may be disposed within the opening OP of the pixel defining layer PDL.

The cathode electrode CE may be disposed on the light emitting structure EMS. The cathode electrode CE may extend over the first to third sub-pixels SP1 to SP3, and the cathode electrode CE may serve as a common electrode for the first to third sub-pixels SP1 to SP3.

The cathode electrode CE may be a thin metal layer having a thickness sufficient to transmit light emitted from the light emitting structure EMS. The cathode electrode CE may include or be formed of a metal material or a transparent conductive material to have a relatively thin thickness. In embodiments, the cathode electrode CE may include at least one selected from various transparent conductive materials including indium tin oxide, indium zinc oxide, indium tin zinc oxide, aluminum zinc oxide, gallium zinc oxide, zinc tin oxide, or gallium tin oxide. In other embodiments, the cathode electrode CE may include at least one selected from silver (Ag), magnesium (Mg), and mixtures thereof. However, the material of the cathode electrode CE is not limited thereto.

Any one of the anode electrodes AE, a portion of the light emitting structure EMS overlapping therewith, and a portion of the cathode electrode CE overlapping therewith will be understood as constituting one light emitting element LD (see FIG. 2). In other words, each of the light emitting elements of the first to third sub-pixels SP1 to SP3 may include one anode electrode, a portion of the light emitting structure EMS overlapping with the anode electrode, and a portion of the cathode electrode CE overlapping with the anode electrode. In each of the first to third sub-pixels SP1 to SP3, holes injected from the anode electrode AE and electrons injected from the cathode electrode CE may be transported into the light emitting layer of the light emitting structure EMS to generate excitons, and when excitons transition from an excited state to a ground state, light may be generated. The luminance of light may be determined depending on the amount of current flowing through the light emitting layer. Depending on the configuration of the light emitting layer, the wavelength range of the generated light may be determined.

An encapsulation layer TFE may be disposed on the cathode electrode CE. The encapsulation layer TFE may cover the light emitting element layer LDL and/or the pixel circuit layer PCL. The encapsulation layer TFE may be configured to prevent oxygen and/or moisture from penetrating into the light emitting element layer LDL. In embodiments, the encapsulation layer TFE may include a structure in which one or more inorganic layers and one or more organic layers are alternately stacked. In an embodiment, for example, the inorganic layer may include silicon nitride, silicon oxide, or silicon oxynitride (SiOxNy). In an embodiment, for example, the organic layer may include an organic insulating material such as acrylic resin, epoxy resin, phenol resin, polyamide resin, polyimide resin, unsaturated polyester resin, poly phenylene ether resin, polyphenylene sulfide resin, or benzocyclobutene (BCB). However, the materials of the organic and inorganic layers of the encapsulation layer TFE are not limited thereto.

To improve the encapsulation efficiency of the encapsulation layer TFE, the encapsulation layer TFE may further include a thin layer including aluminum oxide (AlOx). The thin layer containing aluminum oxide may be disposed on the upper surface of the encapsulation layer TFE facing the optical functional layer OFL and/or on the lower surface of the encapsulating layer TFE facing the light emitting element layer LDL.

The thin layer containing aluminum oxide may be formed through an atomic layer deposition (ALD) method. However, the embodiments are not limited thereto. The encapsulation layer TFE may further include a thin layer formed of at least one selected from various materials suitable for improving the encapsulation efficiency.

The optical functional layer OFL may be disposed on the encapsulation layer TFE. The optical functional layer OFL may include a color filter layer CFL and a lens array LA.

The color filter layer CFL may be disposed between the encapsulation layer TFE and the lens array LA. The color filter layer CFL may be configured to filter light emitted from the light emitting structure EMS and selectively output light in a wavelength range or color corresponding to each sub-pixel. The color filter layer CFL may include color filters CF corresponding to the first to third sub-pixels SP1 to SP3, and each of the color filters CF may pass light of a wavelength range corresponding to the corresponding sub-pixel. In an embodiment, for example, the color filter corresponding to the first sub-pixel SP1 may pass red color light, the color filter corresponding to the second sub-pixel SP2 may pass green color light, and the color filter corresponding to the third sub-pixel SP3 may pass blue color light. Depending on the light emitted from the light emitting structure EMS of each sub-pixel, at least some of the color filters CF may be omitted.

The lens array LA may be disposed on the color filter layer CFL. The lens array LA may include lenses LS corresponding to the first to third sub-pixels SP1 to SP3, respectively. Each of the lenses LS can improve light output efficiency by outputting the light emitted from the light emitting structure EMS through an intended path. The lens array LA may have a relatively high refractive index. In an embodiment, for example, the lens array LA may have a higher refractive index than the overcoat layer OC. In embodiments, the lenses LS may include an organic material. In embodiments, the lenses LS may include an acrylate material. However, the material of the lenses LS is not limited thereto.

In embodiments, compared to the aperture OP of the pixel defining layer PDL, at least a portion of the color filters CF of the color filter layer CFL and at least a portion of the lenses LS of the lens array LA may be shifted in a direction parallel to the plane defined by the first and second directions DR1 and DR2. Specifically, in the central area of the display area DA, the center of the color filter and the center of the lens may be aligned with or overlap the center of the opening OP of the corresponding pixel defining layer PDL when viewed in the third direction DR3. For example, in the central area of the display area DA, the opening OP of the pixel defining layer PDL may completely overlap the corresponding color filter of the color filter layer CFL and the corresponding lens of the lens array LA. In the area adjacent to the non-display area NDA of the display area DA, the center of the color filter and the center of the lens may be shifted in the plane direction from the center of the opening OP of the corresponding pixel defining layer PDL when viewed in the third direction DR3. For example, in the area adjacent to the non-display area NDA of the display area DA, the opening OP of the pixel defining layer PDL may partially overlap the corresponding color filter of the color filter layer CFL and the corresponding lens of the lens array LA. Accordingly, at the central area of the display area DA, light emitted from the light emitting structure EMS may be efficiently output in the normal direction of the display surface. At the outer area of the display area DA, light emitted from the light emitting structure EMS may be efficiently output in a direction inclined by a predetermined angle with respect to the normal direction of the display surface.

The overcoat layer OC may be disposed on the lens array LA. The overcoat layer OC may cover the optical functional layer OFL, the encapsulation layer TFE, the light emitting structure EMS, and/or the pixel circuit layer PCL. The overcoat layer OC may include various materials suitable for protecting lower layers thereof from foreign substances such as dust, moisture, etc. In an embodiment, for example, the overcoat layer OC may include an inorganic insulating layer or an organic insulating layer. In an embodiment, for example, the overcoat layer OC may include epoxy, but embodiments are not limited thereto. The overcoat layer OC may have a lower refractive index than the lens array LA.

The cover window CW may be disposed on the overcoat layer OC. The cover window CW may be configured to protect lower layers thereof. The cover window CW may have a higher refractive index than the overcoat layer OC. The cover window CW may include glass, but embodiments are not limited thereto. In an embodiment, for example, the cover window CW may be an encapsulation glass configured to protect components disposed thereunder. In other embodiments, the cover window CW may be omitted.

Figure 22:
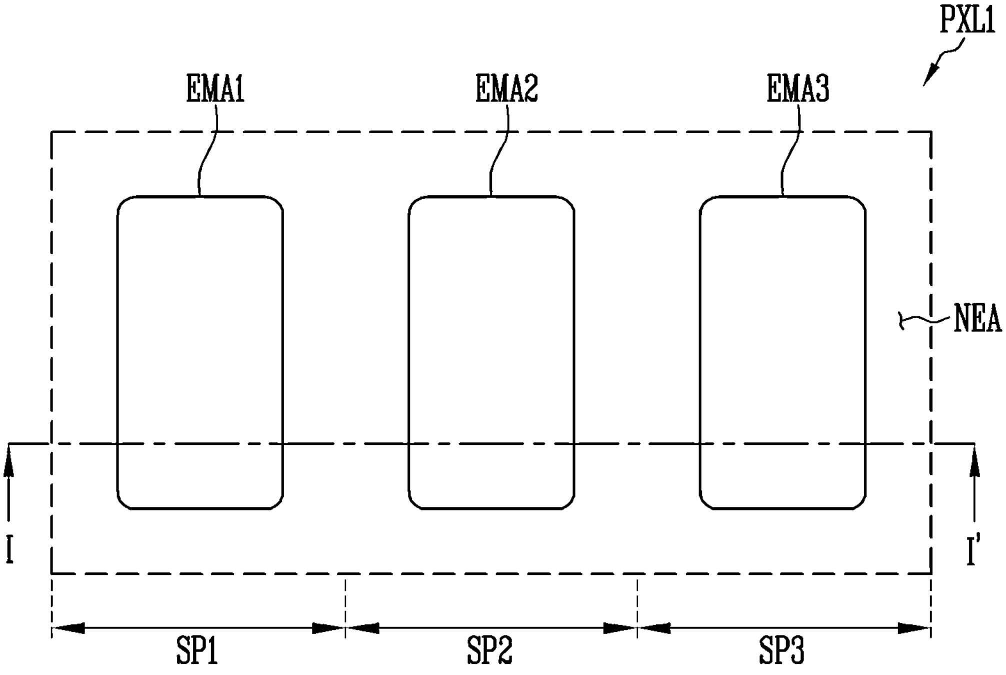
FIG. 22 is a plan view showing an embodiment of one of the pixels of FIG. 21.

FIG. 22 is a plan view showing an embodiment of one of the pixels of FIG. 21. In FIG. 22, the first pixel PXL1 among the first and second pixels PXL1 and PXL2 of FIG. 21 is schematically shown for clarity and concise description. The remaining pixels may be configured similarly to the first pixel PXL1.

Referring to FIGS. 21 and 22, the first pixel PXL1 may include first to third sub-pixels SP1 to SP3 arranged in the first direction DR1.

The first sub-pixel SP1 may include a first emission area EMA1 and a non-emission area NEA around the first emission area EMA1. The second sub-pixel SP2 may include a second emission area EMA2 and a non-emission area NEA around the second emission area EMA2. The third sub-pixel SP3 may include a third emission area EMA3 and a non-emission area NEA around the third emission area EMA3.

The first emission area EMA1 may be an area where light is emitted from a portion of the light emitting structure EMS (see FIG. 21) corresponding to the first sub-pixel SP1. The second emission area EMA2 may be an area where light is emitted from a portion of the light emitting structure EMS corresponding to the second sub-pixel SP2. The third emission area EMA3 may be an area where light is emitted from a portion of the light emitting structure EMS corresponding to the third sub-pixel SP3. As described with reference to FIG. 5, each emission area may be understood as the opening OP of the pixel defining layer PDL corresponding to each of the first to third sub-pixels SP1 to SP3.

Figure 23:
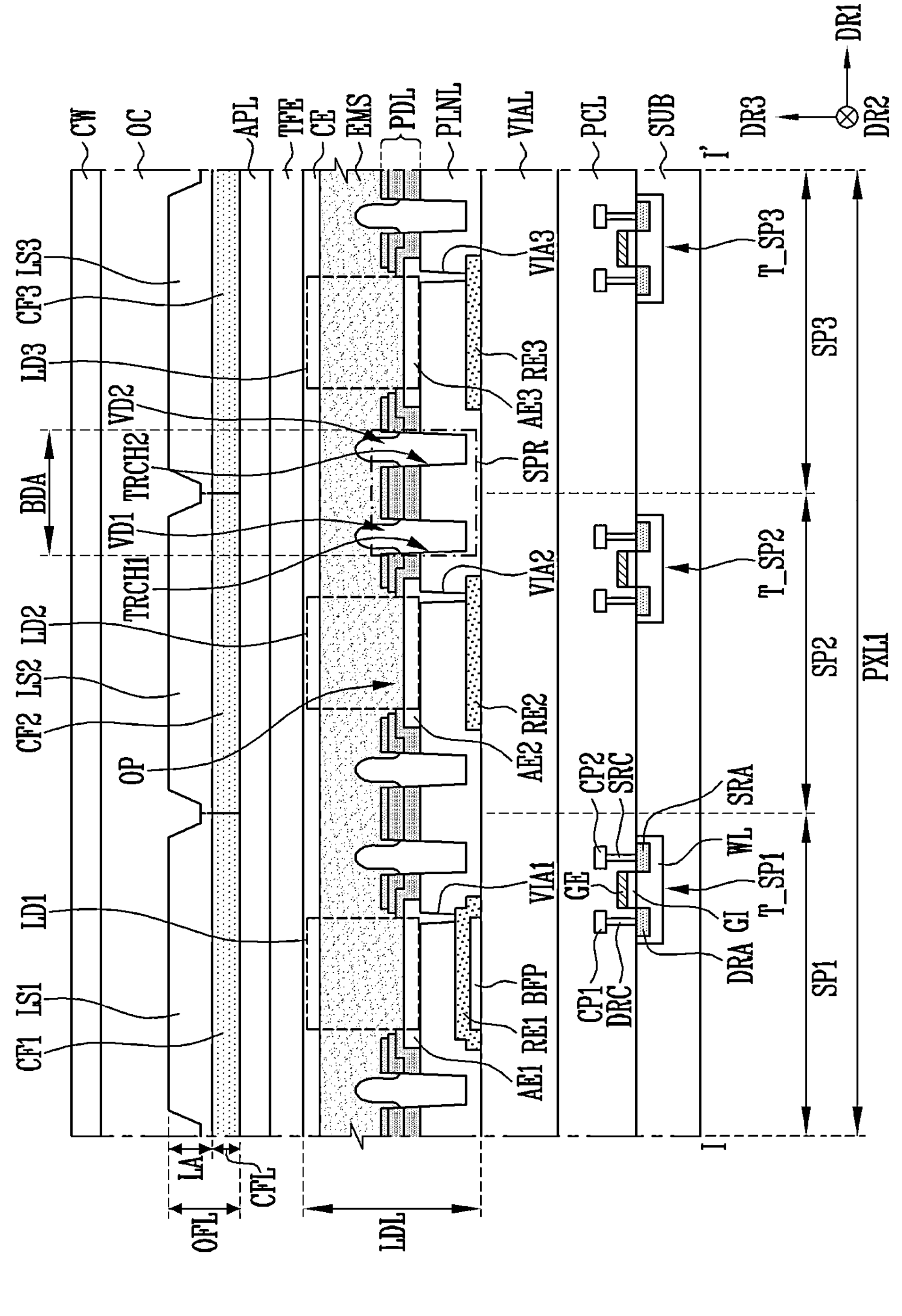
FIG. 23 is a cross-sectional view taken along line I-1' of FIG. 22.

FIG. 23 is a cross-sectional view taken along line I-1' of FIG. 22.

Referring to FIG. 23, in an embodiment of the display panel, a substrate SUB and a pixel circuit layer PCL disposed on the substrate SUB are provided. The substrate SUB may include a silicon wafer substrate formed using a semiconductor process. In an embodiment, for example, the substrate SUB may include silicon, germanium, and/or silicon-germanium.

A pixel circuit layer PCL may be disposed on the substrate SUB. The substrate SUB and the pixel circuit layer PCL may include circuit elements of each of the first to third sub-pixels SP1 to SP3. In an embodiment, for example, the substrate SUB and the pixel circuit layer PCL may include a transistor T_SP1 of the first sub-pixel SP1, a transistor T_SP2 of the second sub-pixel SP2, and a transistor T_SP3 of the third sub-pixel SP3. The transistor T_SP1 of the first sub-pixel SP1 may be one of the transistors included in the sub-pixel circuit SPC (see FIG. 2) of the first sub-pixel SP1, the transistor T_SP2 of the second sub-pixel SP2 may be one of the transistors included in the sub-pixel circuit SPC of the second sub-pixel SP2, and the transistor T_SP3 of the third sub-pixel SP3 may be one of the transistors included in the sub-pixel circuit SPC of the third sub-pixel SP3. In FIG. 23, for clarity and concise description, one of the transistors of each sub-pixel is shown, and the remaining circuit elements are omitted.

The transistor T_SP1 of the first sub-pixel SP1 may include a source region SRA, a drain region DRA, and a gate electrode GE.

The source region SRA and drain region DRA may be disposed in the substrate SUB. A well WL formed through an ion implantation process may be defined in the substrate SUB, and the source region SRA and the drain region DRA may be disposed to be spaced apart from each other in the well WL. The area between the source region SRA and the drain region DRA in the well WL may be defined as a channel region.

The gate electrode GE may overlap the channel region between the source region SRA and the drain region DRA and may be disposed on the pixel circuit layer PCL. The gate electrode GE may be spaced apart from the well WL or the channel region by an insulating material such as the gate insulating layer GI. The gate electrode GE may include a conductive material.

A plurality of layers included in the pixel circuit layer PCL may include insulating layers and conductive patterns disposed between the insulating layers, and such conductive patterns may include first and second conductive patterns CP1 and CP2. The first conductive pattern CP1 may be electrically connected to the drain region DRA through a drain connection portion DRC disposed through one or more insulating layers. The second conductive pattern CP2 may be electrically connected to the source region SRA through the source connection portion SRC disposed through one or more insulating layers.

As the gate electrode GE and the first and second conductive patterns CP1 and CP2 are connected to other circuit elements and/or lines, the transistor T_SP1 of the first sub-pixel SP1 may be provided as one of the transistors of the first sub-pixel SP1.

Each of the transistor T_SP2 of the second sub-pixel SP2 and the transistor T_SP3 of the third sub-pixel SP3 may be configured in the same manner as the transistor T_SP1 of the first sub-pixel SP1.

As such, the substrate SUB and the pixel circuit layer PCL may include circuit elements of each of the first to third sub-pixels SP1 to SP3.

A via layer VIAL may be disposed on the pixel circuit layer PCL. The via layer VIAL may cover the pixel circuit layer PCL and may have an overall flat surface. The via layer VIAL may be configured to planarize the steps on (or uneven upper surface of) the pixel circuit layer PCL. The via layer VIAL may include at least one selected from silicon oxide (SiOx), silicon nitride (SiNx), and silicon carbon nitride (SiCN), but embodiments are not limited thereto.

A light emitting element layer LDL may be disposed on the via layer VIAL. The light emitting element layer LDL may include first to third reflective electrodes RE1 to RE3, a planarization layer PLNL, first to third anode electrodes AE1 to AE3, a pixel defining layer PDL, and a light emitting structure EMS, and a cathode electrode CE.

On the via layer VIAL, first to third reflective electrodes RE1 to RE3 may be disposed in the first to third sub-pixels SP1 to SP3, respectively. Each of the first to third reflective electrodes RE1 to RE3 may contact a circuit element disposed on the pixel circuit layer PCL through a via disposed through the via layer VIAL.

The first to third reflective electrodes RE1 to RE3 may function as full mirrors that reflect light emitted from the light emitting structure EMS toward the display surface (or cover window CW). The first to third reflective electrodes RE1 to RE3 may include metal materials suitable for reflecting light. The first to third reflective electrodes RE1 to RE3 may include at least one selected from aluminum (Al), silver (Ag), magnesium (Mg), platinum (Pt), palladium (Pd), gold (Au), nickel (Ni), neodymium (Nd), iridium (Ir), chromium (Cr), titanium (Ti), and an alloy of two or more materials selected therefrom, but embodiments are not limited thereto.

In embodiments, the connection electrode may be disposed under each of the first to third reflective electrodes RE1 to RE3. The connection electrode can improve the electrical connection characteristics between the corresponding reflective electrode and the circuit elements of the pixel circuit layer PCL. The connection electrode may have a multilayer structure. The multilayer structure may include titanium (Ti), titanium nitride (TiN), tantalum nitride (TaN), etc., but embodiments are not limited thereto. In embodiments, the corresponding reflective electrode may be disposed between multilayers of the connection electrodes.

A buffer pattern BFP may be disposed under at least one of the first to third reflective electrodes RE1 to RE3. The buffer pattern BFP may include an inorganic material such as silicon carbon nitride, but embodiments are not limited thereto. By disposing the buffer pattern BFP, the height of the corresponding reflective electrode in the third direction DR3 may be adjusted. In an embodiment, for example, the buffer pattern BFP may be disposed between the first reflective electrode RE1 and the via layer VIAL to adjust the height of the first reflective electrode RE1.

The first to third reflective electrodes RE1 to RE3 may function as full mirrors, and the cathode electrode CE may function as a half mirror. Light emitted from the light emitting layer of the light emitting structure EMS may be amplified, at least in part, by reciprocating between the corresponding reflective electrode and the cathode electrode CE, and the amplified light may be output through the cathode electrode CE. In this way, a distance between each reflective electrode and the cathode electrode CE may be understood as a resonance distance for light emitted from the light emitting layer of the corresponding light emitting structure EMS.

The first sub-pixel SP1 may have a shorter resonance distance than other sub-pixels due to the buffer pattern. The resonance distance adjusted in this way may allow light in a specific wavelength range (e.g., red color) to be effectively and efficiently amplified. Accordingly, the first sub-pixel SP1 can effectively and efficiently output light in the corresponding wavelength range.

In FIG. 23, the buffer pattern BFP is shown to be provided to the first sub-pixel SP1 and not to the second and third sub-pixels SP2 and SP3, but embodiments are not limited thereto. The buffer pattern may be also provided to at least one selected from the second and third sub-pixels SP2 and SP3 to adjust the resonance distance thereof. In an embodiment, for example, the first to third sub-pixels SP1 to SP3 may correspond to red, green, and blue, respectively, and a distance between the first reflective electrode RE1 and the cathode electrode CE may be shorter than a distance between the second reflective electrode RE2 and the cathode electrode CE, and a distance between the second reflective electrode RE2 and the cathode electrode CE may be shorter than a distance between the third reflective electrode RE3 and the cathode electrode CE.

To planarize the steps between the first to third reflective electrodes RE1 to RE3, a planarization layer PLNL may be disposed on the via layer VIAL and the first to third reflective electrodes RE1 to RE3. The planarization layer PLNL may generally cover the first to third reflective electrodes RE1 to RE3 and the via layer VIAL and may have a flat surface. In embodiments, the planarization layer PLNL may be omitted.

On the planarization layer PLNL, first to third anode electrodes AE1 to AE3 may be disposed overlapping the first to third reflective electrodes RE1 to RE3, respectively. The first to third anode electrodes AE1 to AE3 may have shapes similar to the first to third emission areas EMA1 to EMA3 of FIG. 22 when viewed in the third direction DR3. The first to third anode electrodes AE1 to AE3 may be connected to the first to third reflective electrodes RE1 to RE3, respectively. The first anode electrode AE1 may be connected to the first reflective electrode RE1 through a first via VIA1 disposed through the planarization layer PLNL. The second anode electrode AE2 may be connected to the second reflective electrode RE2 through a second via VIA2 disposed through the planarization layer PLNL. The third anode electrode AE3 may be connected to the third reflective electrode RE3 through a third via VIA3 disposed through the planarization layer PLNL.

In embodiments, the first to third anode electrodes AE1 to AE3 may include at least one selected from transparent conductive materials such as indium tin oxide (ITO), indium zinc oxide (IZO), zinc oxide (ZnOx), indium gallium zinc oxide (IGZO), and indium tin zinc oxide (ITZO). However, the materials of the first to third anode electrodes AE1 to AE3 are not limited thereto. In an embodiment, for example, the first to third anode electrodes AE1 to AE3 may include titanium nitride.

In embodiments, insulating layers may be further provided to adjust the height of one or more of the first to third anode electrodes AE1 to AE3. The insulating layers may be disposed between one or more of the first to third anode electrodes AE1 to AE3 and the corresponding reflective electrodes. In such embodiments, the planarization layer PLNL and/or the buffer pattern BFP may be omitted. In an embodiment, for example, the first to third sub-pixels SP1 to SP3 may correspond to red, green, and blue, respectively, and a distance between the first anode electrode AE1 and the cathode electrode CE may be shorter than a distance between the second anode electrode AE2 and the cathode electrode CE, and a distance between the second anode electrode AE2 and the cathode electrode CE may be shorter than a distance between the third anode electrode AE3 and the cathode electrode CE. The pixel defining layer PDL may be disposed on portions of the first to third anode electrodes AE1 to AE3 and the planarization layer PLNL. The pixel defining layer PDL may be provided with an opening OP defined therethrough to expose a portion of each of the first to third anode electrodes AE1 to AE3. The opening OP of the pixel defining layer PDL may define the emission area of each of the first to third sub-pixels SP1 to SP3. In this way, the pixel defining layer PDL may be disposed in the non-emission area NEA of FIG. 22 and define the first to third emission areas EMA1 to EMA3 of FIG. 22.

In embodiments, the pixel defining layer PDL may include a plurality of inorganic insulating layers. Each of the plurality of inorganic insulating layers may include at least one selected from silicon oxide (SiOx) and silicon nitride (SiNx). In an embodiment, for example, the pixel defining layer PDL may include first to third inorganic insulating layers sequentially stacked, and the first to third inorganic insulating layers may include silicon nitride, silicon oxide, and silicon nitride, respectively. However, the embodiments are not limited thereto. The first to third inorganic insulating layers may have a step-shaped cross section in an area adjacent to the opening OP.

A separator SPR may be provided at the boundary area BDA between neighboring sub-pixels. In other words, a separator SPR may be provided at each of the boundary areas between the sub-pixels SP in FIG. 20.

The separator SPR may cause a discontinuity to be formed within the light emitting structure EMS at the boundary area BDA. In an embodiment, for example, the light emitting structure EMS may be disconnected or bent at the boundary area BDA due to the separator SPR.

The separator SPR may be provided in or on the pixel defining layer PDL. The pixel defining layer PDL may include one or more trenches TRCH1 and TRCH2 as the separator SPR at the boundary area BDA. In embodiments, as shown in FIG. 23, one or more trenches TRCH1 and TRCH2 may be defined through the pixel defining layer PDL and may be defined partially in the planarization layer PLNL. In other embodiments, one or more trenches TRCH1 and TRCH2 may be defined through the pixel defining layer PDL and the planarization layer PLNL and may be defined partially in the via layer VIAL. In other embodiments, one or more trenches TRCH1 and TRCH2 may be defined at least partially through the planarization layer PLNL and/or via layer VIAL, and a portion of the defining layer PDL may be disposed in the one or more trenches TRCH1 and TRCH2.

In FIG. 23, an embodiment where two trenches TRCH1 and TRCH2 are provided at the boundary area BDA is shown. However, the embodiments are not limited thereto. In an embodiment, for example, the pixel defining layer PDL may include one trench in the boundary area BDA. Alternatively, the pixel defining layer PDL may include three or more trenches at the boundary area BDA.

Due to the first and second trenches TRCH1 and TRCH2, discontinuous portions such as the first void VD1 and the second void VD2 may be formed in the light emitting structure EMS at the boundary area BDA. Some of the plurality of layers stacked in the light emitting structure EMS may be disconnected or bent by the first and second voids VD1 and VD2. In an embodiment, for example, at least one charge generation layer included in the light emitting structure EMS may be broken in the first and second voids VD1 and VD2. In this way, due to the first and second trenches TRCH1 and TRCH2, portions of the light emitting structure EMS included in the first to third sub-pixels SP1 to SP3 may be at least partially separated.

In FIG. 23, an embodiment where first and second voids VD1 and VD2 are formed in the light emitting structure EMS in the boundary area BDA is shown. However, this is an example, and the embodiments are not limited thereto. In an embodiment, for example, a concave valley may be formed in the light emitting structure EMS at the boundary area BDA. Depending on the shapes of the first and second trenches TRCH1 and TRCH2, discontinuous portions formed in the light emitting structure EMS may change variously.

In embodiments, the light emitting structure EMS may be formed through processes such as a vacuum deposition, an inkjet printing, etc. In this case, the same materials as the light emitting structure EMS may be disposed on the bottom surfaces adjacent to the via layer VIAL of the first and second trenches TRCH1 and TRCH2.

The separator SPR may be provided in various forms so that the light emitting structure EMS may have discontinuous portions at the boundary area BDA. In embodiments, inorganic insulating patterns additionally stacked on the pixel defining layer PDL may be provided at the boundary area BDA without the first and second trenches TRCH1 and TRCH2. In embodiments, the width of the uppermost inorganic insulating pattern among the additionally stacked inorganic insulating patterns, may be greater than the width of the inorganic insulating pattern disposed directly thereunder. In an embodiment, for example, at the boundary area BDA, first to third inorganic insulating patterns may be sequentially stacked from the pixel defining layer PDL, and the uppermost third inorganic insulating pattern may have a greater width than the second inorganic insulating pattern. In an embodiment, for example, the pixel defining layer PDL may have a "T"-shaped or "I"-shaped cross section at the boundary area BDA. Depending on the shape of the pixel defining layer PDL, the plurality of layers included in the light emitting structure EMS may be at least partially broken or bent at the boundary area BDA.

The light emitting structure EMS may be disposed on the anode electrodes AE exposed by the opening OP of the pixel defining layer PDL. The light emitting structure EMS may fill the opening OP of the pixel defining layer PDL and may be disposed entirely over the first to third sub-pixels SP1 to SP3. As described above, the light emitting structure EMS may be at least partially disconnected or bent at the boundary area BDA due to the separator SPR. Accordingly, when the display panel DP is operated, the current flowing out from each of the first to third sub-pixels SP1 to SP3 to the neighboring sub-pixel through the layers included in the light emitting structure EMS, may decrease. Accordingly, the first to third light emitting elements LD1 to LD3 may operate with relatively high reliability.

The cathode electrode CE may be disposed on the light emitting structure EMS. The cathode electrode CE may be commonly provided to the first to third sub-pixels SP1 to SP3. The cathode electrode CE may function as a half mirror that partially transmits and partially reflects light emitted from the light emitting structure EMS.

The first anode electrode AE1, the portion of the light emitting structure EMS overlapping with the first anode electrode AE1, and the portion of the cathode electrode CE overlapping with the first anode electrode AE1 may constitute the first light emitting element LD1. The second anode electrode AE2, the portion of the light emitting structure EMS overlapping with the second anode electrode AE2, and the portion of the cathode electrode CE overlapping with the second anode electrode AE2 may constitute the second light emitting element LD2. The third anode electrode AE3, the portion of the light emitting structure EMS overlapping with the third anode electrode AE3, and the portion of the cathode electrode CE overlapping with the third anode electrode AE3 may constitute the third light emitting element LD3.

An encapsulation layer TFE may be disposed on the cathode electrode CE. The encapsulation layer TFE can prevent oxygen and/or moisture from penetrating into the light emitting element layer LDL.

An optical functional layer OFL may be disposed on the encapsulation layer TFE. In embodiments, the optical functional layer OFL may be attached to the encapsulation layer TFE through an adhesive layer APL. In an embodiment, for example, the optical functional layer OFL may be manufactured separately and attached to the encapsulation layer TFE through the adhesive layer APL. The adhesive layer APL may further perform the function of protecting lower layers including the encapsulation layer TFE.

The optical functional layer OFL may include a color filter layer CFL and a lens array LA. The color filter layer CFL may include first to third color filters CF1 to CF3 respectively corresponding to the first to third sub-pixels SP1 to SP3. The first to third color filters CF1 to CF3 may pass light of different wavelength ranges. In an embodiment, for example, the first to third color filters CF1 to CF3 may pass light of red, green, and blue colors, respectively.

In embodiments, the first to third color filters CF1 to CF3 may partially overlap at the boundary area BDA. In other embodiments, the first to third color filters CF1 to CF3 may be spaced apart from each other, and a black matrix may be provided between the first to third color filters CF1 to CF3.

The lens array LA may be disposed on the color filter layer CFL. The lens array LA may include first to third lenses LS1 to LS3 respectively corresponding to the first to third sub-pixels SP1 to SP3. The first to third lenses LS1 to LS3 can improve light output efficiency by outputting the light emitted from the first to third light emitting elements LD1 to LD3 along an intended path, respectively.

Figure 24:
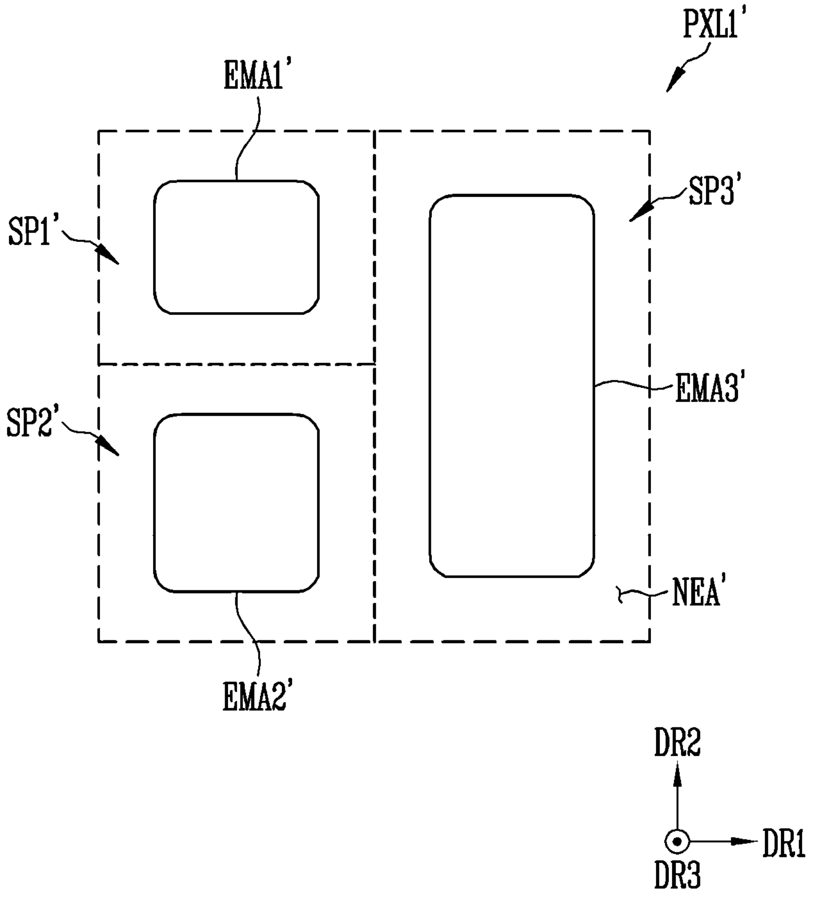
FIG. 24 is a plan view showing another embodiment of one of the pixels of FIG. 21.

FIG. 24 is a plan view showing another embodiment of one of the pixels of FIG. 21.

Referring to FIG. 24, the first pixel PXL1' may include first to third sub-pixels SP1' to SP3'.

The first sub-pixel SP1' may include a first emission area EMA1' and a non-emission area NEA' around the first emission area EMA1'. The second sub-pixel SP2' may include a second emission area EMA2' and a non-emission area NEA' around the second emission area EMA2'. The third sub-pixel SP3' may include a third emission area EMA3' and a non-emission area NEA' around the third emission area EMA3'.

The first sub-pixel SP1' and the second sub-pixel SP2' may be arranged in the second direction DR2. The third sub-pixel SP3' may be arranged in the first direction DR1 with respect to each of the first and second sub-pixels SP1' and SP2'.

The second sub-pixel SP2' may have a greater area than the first sub-pixel SP1', and the third sub-pixel SP3' may have a greater area than the second sub-pixel SP2'. Accordingly, the second emission area EMA2' may have a greater area than the first emission area EMA1', and the third emission area EMA3' may have a greater area than the second emission area EMA2'. However, the embodiments are not limited thereto. In an embodiment, for example, the first and second sub-pixels SP1' and SP2' may have substantially a same area as each other, and the third sub-pixel SP3' may have a greater area than each of the first and second sub-pixels SP1' and SP2'. As such, the areas of the first to third sub-pixels SP1' to SP3' may change according to the embodiments.

Figure 25:
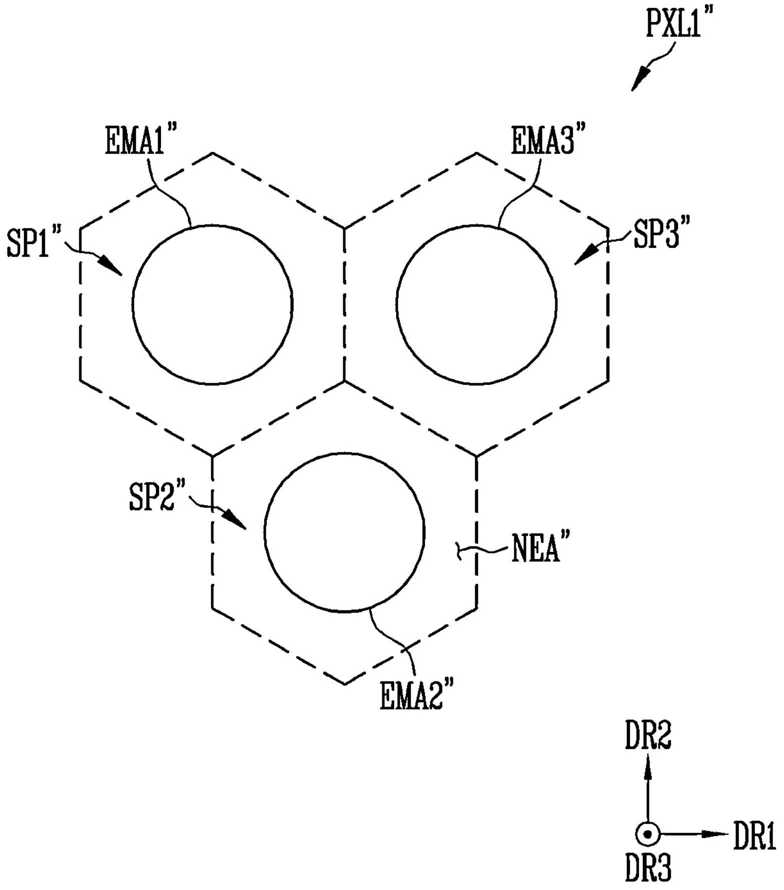
FIG. 25 is a plan view showing another embodiment of one of the pixels of FIG. 21.

FIG. 25 is a plan view showing another embodiment of one of the pixels of FIG. 21.

Referring to FIG. 25, the first sub-pixel SP1" may include a first emission area EMA1" and a non-emission area NEA" around the first emission area EMA1". The second sub-pixel SP2" may include a second emission area EMA2" and a non-emission area NEA" around the second emission area EMA2". The third sub-pixel SP3" may include a third emission area EMA3" and a non-emission area NEA" around the third emission area EMA3".

The first to third sub-pixels SP1" to SP3" may have polygonal shapes when viewed in the third direction DR3. In an embodiment, for example, the first to third sub-pixels SP1" to SP3" may have hexagonal shapes as shown in FIG. 25.

The first to third emission areas EMA1" to EMA3" may have circular shapes when viewed in the third direction DR3. However, the embodiments are not limited thereto. In an embodiment, for example, each of the first to third emission areas EMA1" to EMA3" may have a polygonal shape.

The first and third sub-pixels SP1" and SP3" may be arranged in the first direction DR1. The second sub-pixel SP2" may be arranged in a direction inclined) at an acute angle (or diagonally) with respect to the second direction DR2 with respect to the first sub-pixel SP1".

The arrangements of sub-pixels shown in FIGS. 22, 24, and 25 are examples, and embodiments are not limited thereto. Each pixel may include two or more sub-pixels, the sub-pixels may be arranged in various ways, each of the sub-pixels may have various shapes, and each of emission areas thereof may also have various shapes.

Figure 26:
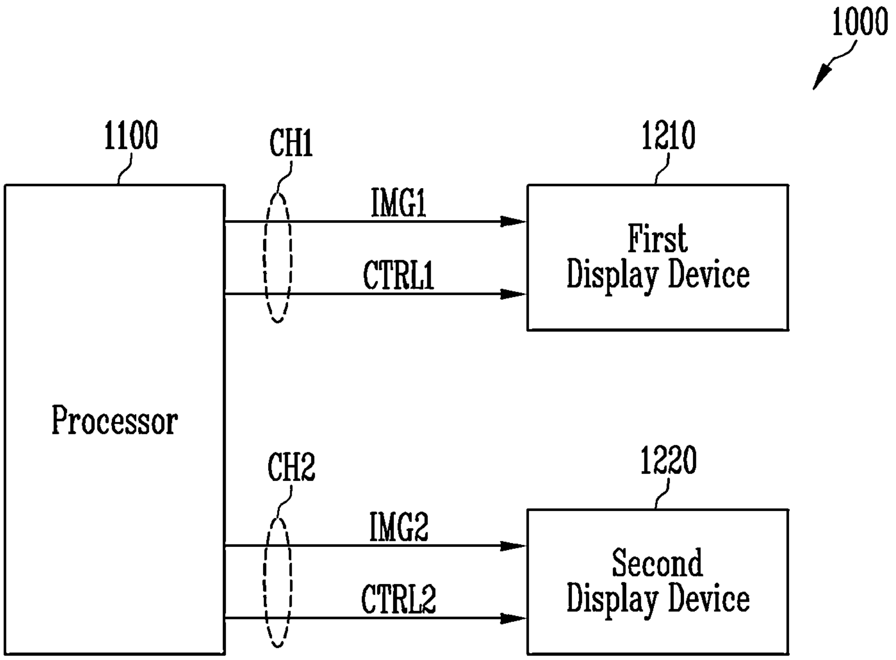
FIG. 26 is a block diagram showing an embodiment of a display system.

FIG. 26 is a block diagram showing an embodiment of a display system.

Referring to FIG. 26, an embodiment of the display system 1000 may include a processor 1100 and one or more display devices 1210 and 1220.

The processor 1100 may perform various tasks and calculations. In embodiments, the processor 1100 may include an application processor, a graphics processor, a microprocessor, a central processing unit (CPU), etc. The processor 1100 may be connected to and control other components of the display system 1000 through a bus system.

In an embodiment, as shown in FIG. 26, the display system 1000 may include first and second display devices 1210 and 1220. The processor 1100 may be connected to the first display device 1210 through a first channel CH1 and to the second display device 1220 through a second channel CH2.

Through the first channel CH1, the processor 1100 may transmit first image data IMG1 and a first control signal CTRL1 to the first display device 1210. The first display device 1210 may display an image based on the first image data IMG1 and the first control signal CTRL1. The first display device 1210 may be configured similarly to the display device 100 described with reference to FIG. 1. In this case, the first image data IMG1 and the first control signal CTRL1 may be provided as the input image data IMG and control signal CTRL of FIG. 1, respectively.

Through the second channel CH2, the processor 1100 may transmit second image data IMG2 and a second control signal CTRL2 to the second display device 1220. The second display device 1220 may display an image based on the second image data IMG2 and the second control signal CTRL2. The second display device 1220 may be configured similarly to the display device 100 described with reference to FIG. 1. In this case, the second image data IMG2 and the second control signal CTRL2 may be provided as the input image data IMG and control signal CTRL of FIG. 1, respectively.

The display system 1000 may include a computing system that provides image display functions, such as a portable computer, a mobile phone, a smart phone, a tablet personal computer, a smart watch, a watch phone, a portable multimedia player (PMP), a navigation, an ultra-mobile personal computer (UMPC), and the like. In addition, the display system 1000 may include at least one of a head mounted display (HMD) device, a virtual reality (VR) device, a mixed reality (MR) device, an augmented reality (AR) device, or the like.

Figure 27:
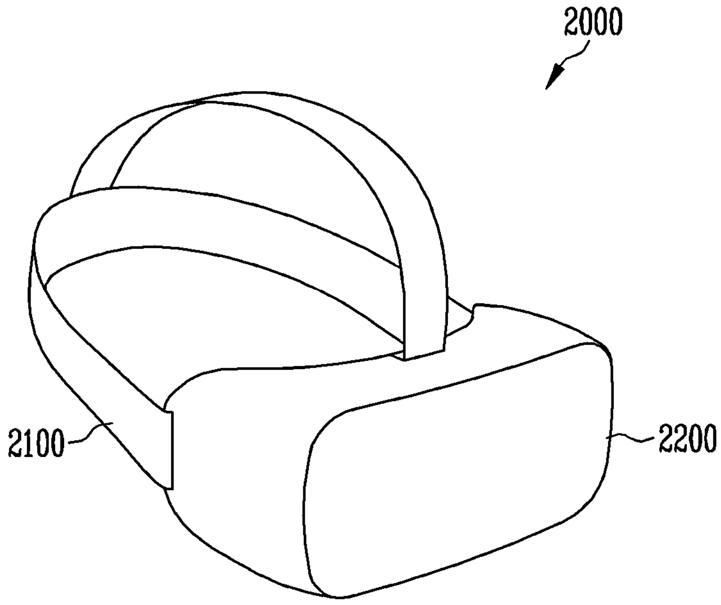
FIG. 27 is a perspective view showing an embodiment of the display system of FIG. 26.

FIG. 27 is a perspective view showing an embodiment of the display system of FIG. 26.

Referring to FIG. 27, the display system 1000 of FIG. 26 may be applied to a head mounted display device 2000. The head mounted display device 2000 may be a wearable electronic device that can be worn on the user's head.

The head mounted display device 2000 may include a head mounted band 2100 and a display device storage case 2200. The head mounted band 2100 may be connected to the display device storage case 2200. The head mounted band 2100 may include a horizontal band and/or a vertical band for fixing the head mounted display device 2000 to the user's head. The horizontal band may be configured to surround the sides of the user's head, and the vertical band may be configured to surround the top of the user's head. However, the embodiments are not limited thereto. In an embodiment, for example, the head mounted band 2100 may be implemented in the form of glasses frames, helmets, or the like.

The display device storage case 2200 may accommodate the first and second display devices 1210 and 1220 of FIG. 26. The display device storage case 2200 may further accommodate the processor 1100 of FIG. 26.

Figure 28:
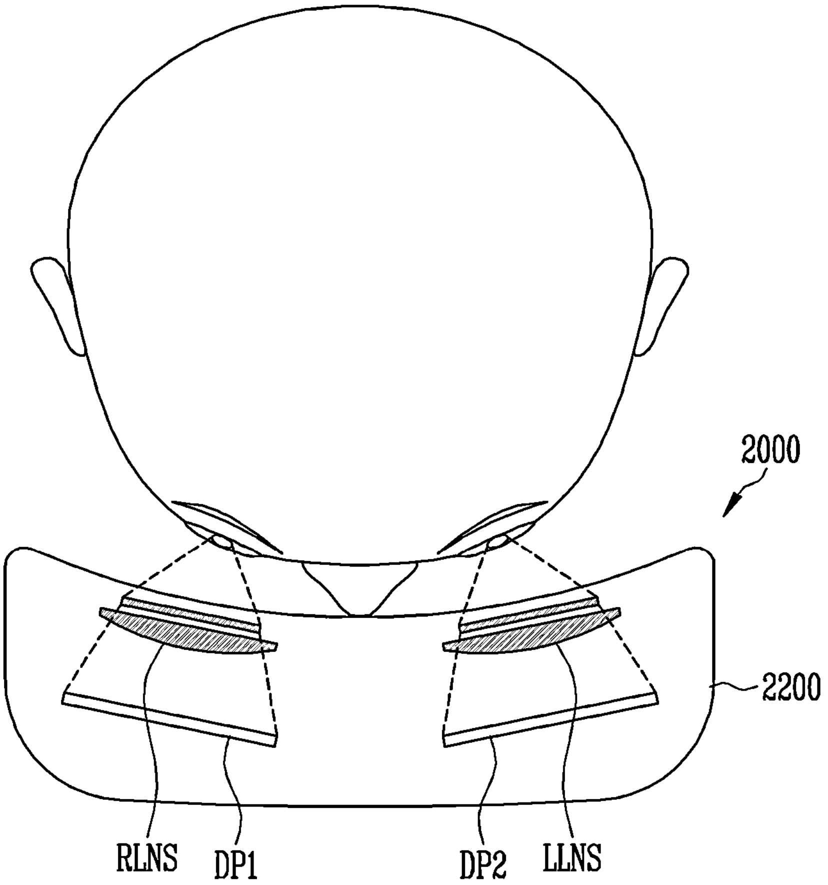
FIG. 28 is a view showing an embodiment of a head-mounted display device worn by the user of FIG. 27.

FIG. 28 is a view showing an embodiment of a head-mounted display device worn by the user of FIG. 27.

Referring to FIG. 28, the first display panel DP1 of the first display device 1210 and the second display panel DP2 of the second display device 1220 may be disposed in the head mounted display device 2000. The head mounted display device 2000 may further include one or more lenses LLNS and RLNS.

In the display device storage case 2200, the right eye lens RLNS may be disposed between the first display panel DP1 and the user's right eye. In the display device storage case 2200, the left eye lens LLNS may be disposed between the second display panel DP2 and the user's left eye.

The image output from the first display panel DP1 may be displayed to the user's right eye through the right eye lens RLNS. The right eye lens RLNS may refract light from the first display panel DP1 to be directed toward the user's right eye. The right eye lens RLNS may perform an optical function to adjust a viewing distance between the first display panel DP1 and the user's right eye.

The image output from the second display panel DP2 may be displayed to the user's left eye through the left eye lens LLNS. The left eye lens LLNS may refract light from the second display panel DP2 to be directed toward the user's left eye. The left eye lens LLNS may perform an optical function to adjust a viewing distance between the second display panel DP2 and the user's left eye.

In embodiments, each of the right eye lens RLNS and the left eye lens (LLNS) may include an optical lens having a pancake-shaped cross section. In embodiments, each of the right eye lens RLNS and the left eye lens LLNS may include a multi-channel lens including sub-areas with different optical properties. In this case, each display panel may output images corresponding to sub-areas of the multi-channel lens, and the output images may pass through the corresponding sub-areas to be viewed by the user.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A sub-pixel comprising:

a first transistor including a first electrode connected to a first node, a second electrode connected to a first power line, to which a first driving voltage is applied, and a gate electrode connected to a second node;

a second transistor including a first electrode connected to the first node, a second electrode connected to the second node, and a gate electrode connected to a first sub-gate line;

a third transistor including a first electrode connected to one of a plurality of data lines, a second electrode connected to a third node, and a gate electrode connected to a second sub-gate line;

a fourth transistor including a first electrode connected to the third node, a second electrode connected to a second power line, to which a reference voltage is applied, and a gate electrode connected to a first emission control line;

a fifth transistor including a first electrode connected to the first node, a second electrode connected to a fourth node, and a gate electrode connected to a second emission control line;

a sixth transistor including a first electrode connected to the fourth node, a second electrode connected to a third power line, to which an initialization voltage is applied, and a gate electrode connected to a third sub-gate line;

a capacitor including a first electrode connected to the second node, and a second electrode connected to the third node;

a light emitting element including a first electrode connected to the fourth node, and a second electrode connected to a fourth power line, to which a second driving voltage is applied; and wherein an emission control signal input to the second emission control line is a phase-delayed signal by one horizontal period from an emission control signal input to the first emission control line.

2. The sub-pixel of claim 1, wherein the capacitor is a first capacitor, and the sub-pixel further include a second capacitor including a first electrode connected to the second node, and a second electrode connected to the first power line.

3. The sub-pixel of claim 1, wherein each of the first to sixth transistors is a P-type transistor.

4. The sub-pixel of claim 1, wherein a voltage level of the first driving voltage is higher than a voltage level of the second driving voltage.

5. The sub-pixel of claim 1, wherein each of the second transistor, the fourth transistor, the fifth transistor, and the sixth transistor is turned on during a first period, and the third transistor is turned off during the first period.

6. The sub-pixel of claim 5, wherein the initialization voltage is applied to the second node and the reference voltage is applied to the fourth node during the first period.

7. The sub-pixel of claim 5, wherein each of the first transistor, the second transistor, and the third transistor is turned on during a second period after the first period, and each of the fourth transistor and the fifth transistor is turned off during the second period.

8. The sub-pixel of claim 7, wherein the first driving voltage is applied to the second node during the second period, and a voltage of a data signal is applied to the third node during the second period.

9. The sub-pixel of claim 7, wherein each of the first transistor, the fourth transistor, and the fifth transistor is turned on during a third period after the second period, and each of the third transistor and the sixth transistor is turned off during the third period.

10. The sub-pixel of claim 9, wherein a current flows through the first transistor and the fifth transistor during the third period, and the reference voltage is applied to the third node during the third period.

11. A display device comprising:

a display panel including a plurality of sub-pixels, a plurality of data lines, a plurality of sub-gate lines, and a plurality of emission control lines connected to the plurality of sub-pixels;

a data driver which provides data signals to the plurality of data lines;

a gate driver which provides gate signals to the plurality of sub-gate lines and emission control signals to the plurality of emission control lines; and a voltage generator which applies an initialization voltage, a reference voltage, a first driving voltage, and a second driving voltage to the plurality of sub-pixels, wherein the plurality of sub-gate lines include first to third sub-gate lines, the plurality of emission control lines include first and second emission control lines, and a sub-pixel of the plurality of sub-pixels includes:

a first transistor including a first electrode connected to a first node, a second electrode connected to a first power line to which the first driving voltage is applied, and a gate electrode connected to a second node, a second transistor including a first electrode connected to the first node, a second electrode connected to the second node, and a gate electrode connected to the first sub-gate line, a third transistor including a first electrode connected to a corresponding one of the plurality of data lines, a second electrode connected to a third node, and a gate electrode connected to the second sub-gate line, a fourth transistor including a first electrode connected to the third node, a second electrode connected to a second power line to which the reference voltage is applied, and a gate electrode connected to the first emission control line, a fifth transistor including a first electrode connected to the first node, a second electrode connected to a fourth node, and a gate electrode connected to the second emission control line, a sixth transistor including a first electrode connected to the fourth node, a second electrode connected to a third power line, to which the initialization voltage is applied, and a gate electrode connected to the third sub-gate line, a capacitor including a first electrode connected to the second node and a second electrode connected to the third node, and a light emitting element including a first electrode connected to the fourth node and a second electrode connected to a fourth power line, to which the second driving voltage is applied.

12. The display device of claim 11, wherein an emission control signal input to the second emission control line is a phase-delayed signal by one horizontal period from an emission control signal input to the first emission control line.

13. The display device of claim 11, wherein the capacitor is a first capacitor, and the sub-pixel further includes a second capacitor including a first electrode connected to the second node and a second electrode connected to the first power line.

14. The display device of claim 11, wherein the gate driver provides a gate signal at a turn-on level to each of the second transistor, the fourth transistor, the fifth transistor, and the sixth transistor during a first period, and provides a gate signal of at a turn-off level to the third transistor during the first period.

15. The display device of claim 14, wherein the gate driver provides a gate signal at a turn-on level to each of the first transistor, the second transistor, and the third transistor during a second period after the first period, and provides a gate signal at a turn-off level to each of the fourth transistor and the fifth transistor during the second period.

16. The display device of claim 15, wherein the gate driver provides a gate signal at a turn-on level to each of the first transistor, the fourth transistor, and the fifth transistor during a third period after the second period, and provides a gate signal at a turn-off level to each of the third transistor and the sixth transistor during the third period.

17. A driving method of an electronic device including a sub-pixel, the sub-pixel including a first transistor and a capacitor, the driving method comprising:

during a first period, supplying an initialization voltage to a second node connected to a first electrode of the capacitor and a gate electrode of the first transistor, and supplying a reference voltage to a third node connected to a second electrode of the capacitor;

during a second period, floating the third node;

during a third period, supplying a first driving voltage to the second node and supplying a data signal to the third node;

during a fourth and fifth period, floating the second node and the third node;

during a sixth period, floating the second node and supplying the reference voltage to the third node; and during a seventh period, allowing a current to flow in the first transistor based on a voltage applied to the second node.

18. The driving method of claim 17, wherein the sub-pixel further includes a light emitting element, and the initialization voltage is supplied to the light emitting element during the first period.

19. The driving method of claim 17, wherein a first gate signal at a turn-on level is supplied to a second transistor of the sub-pixel, which connects a first node connected to a first electrode of the first transistor and the second node during the first period.

* * * * *